United States Patent
Moriya et al.

(10) Patent No.: US 8,805,082 B2
(45) Date of Patent: Aug. 12, 2014

(54) IMAGE PROCESSING APPARATUS

(75) Inventors: Shotaro Moriya, Tokyo (JP); Hideki Yoshii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 243 days.

(21) Appl. No.: 13/181,080

(22) Filed: Jul. 12, 2011

(65) Prior Publication Data

US 2012/0045148 A1 Feb. 23, 2012

(30) Foreign Application Priority Data

Aug. 23, 2010 (JP) .................................. 2010-186023

(51) Int. Cl.
*G06K 9/00* (2006.01)

(52) U.S. Cl.
CPC ...................................... *G06K 9/00* (2013.01)
USPC ............ 382/190; 382/168; 382/239; 382/270

(58) Field of Classification Search
CPC . H04N 1/40062; H04N 1/40075; H04N 7/18; H04N 19/002; G06T 3/4053; G06T 2207/10016; G06T 5/002; G06T 5/20; G06T 5/008; G06T 2207/20036; G02B 27/2235; G02B 27/017
USPC ............ 358/1.2, 1.9, 434, 518, 450; 382/190, 382/254
See application file for complete search history.

(56) References Cited

U.S. PATENT DOCUMENTS

| | | | | |
|---|---|---|---|---|
| 4,984,076 A * | 1/1991 | Watanabe et al. | .......... | 375/240.2 |
| 5,140,413 A * | 8/1992 | Suzuki et al. | ................ | 358/518 |
| 5,177,795 A * | 1/1993 | Tanioka et al. | ................ | 382/270 |
| 5,387,983 A * | 2/1995 | Sugiura et al. | ................ | 358/434 |
| 5,550,936 A * | 8/1996 | Someya et al. | ................ | 382/263 |
| 5,555,107 A * | 9/1996 | Funada et al. | ................ | 358/518 |
| 5,881,178 A * | 3/1999 | Tsykalov et al. | ............. | 382/260 |
| 5,930,397 A * | 7/1999 | Tsujii et al. | ................... | 382/239 |
| 6,324,309 B1 | 11/2001 | Tokuyama et al. | | |
| 6,389,179 B1 * | 5/2002 | Katayama et al. | ............ | 382/284 |
| 6,411,741 B1 * | 6/2002 | Hamamura et al. | .......... | 382/254 |
| 6,678,322 B1 * | 1/2004 | Mihara | ................... | 375/240.02 |
| 6,728,425 B1 | 4/2004 | Tokuyama et al. | | |
| 7,664,335 B2 | 2/2010 | Kurumisawa et al. | | |
| 2004/0061882 A1 * | 4/2004 | Yamakawa | ..................... | 358/1.9 |

(Continued)

FOREIGN PATENT DOCUMENTS

| | | |
|---|---|---|
| JP | 02-032680 | 2/1990 |
| JP | 07-222064 | 8/1995 |

(Continued)

*Primary Examiner* — Vu Le
*Assistant Examiner* — Aklilu Woldemariam
(74) *Attorney, Agent, or Firm* — Birch, Stewart, Kolasch & Birch, LLP

(57) ABSTRACT

An image processing apparatus has an image analyzer including a feature detector, a feature combiner, and a resolution discrimination signal generator. For each pixel in a prescribed area of an input image, the feature detector outputs a representative difference value obtained from the pixel values of pixels positioned, with reference to that pixel, at prescribed intervals. The feature combiner outputs a combined feature value obtained from the representative difference values obtained for each pixel in the described area. The resolution discrimination signal generator outputs a resolution discrimination signal obtained from the combined feature value. The resolution discrimination signal has a monotonic non-decreasing relationship to the combined feature value. The resolution discrimination signal indicates an extent to which the input image includes signal components with frequencies equal to or greater than a particular frequency determined by the prescribed intervals.

2 Claims, 15 Drawing Sheets

(56) References Cited

U.S. PATENT DOCUMENTS

| | | |
|---|---|---|
| 2007/0019863 A1* | 1/2007 | Ito .................................. 382/190 |
| 2007/0268400 A1 | 11/2007 | Kondo et al. |
| 2008/0174699 A1 | 7/2008 | Suzuki et al. |
| 2009/0009660 A1 | 1/2009 | Kageyama et al. |
| 2009/0041349 A1 | 2/2009 | Suzuki et al. |
| 2009/0324092 A1* | 12/2009 | Aoyama ........................ 382/199 |

FOREIGN PATENT DOCUMENTS

| | | |
|---|---|---|
| JP | 11-027517 | 1/1999 |
| JP | 11-075154 | 3/1999 |
| JP | 2000-341505 | 12/2000 |
| JP | 2003-153284 A | 5/2003 |
| JP | 2006-166188 A | 6/2006 |
| JP | 2007-312061 | 11/2007 |
| JP | 2008-060722 | 3/2008 |
| JP | 2008-085993 | 4/2008 |
| JP | 2009-015025 | 1/2009 |
| JP | 2009-044341 | 2/2009 |
| JP | 2009-044417 | 2/2009 |
| JP | 2010-081461 | 4/2010 |
| JP | 2010-251988 A | 11/2010 |

* cited by examiner

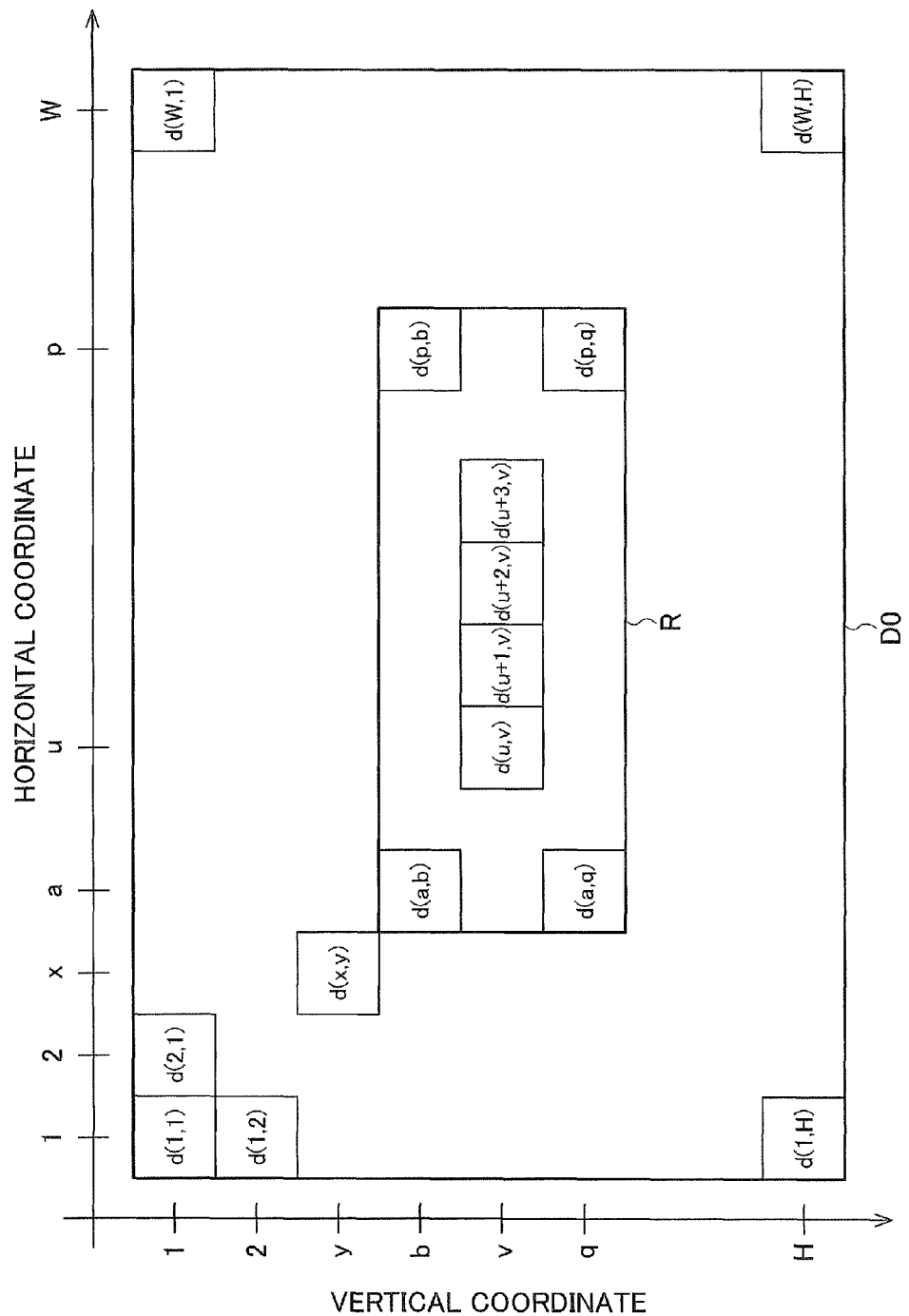

IMAGE PROCESSING APPARATUS

BACKGROUND OF THE INVENTION

1. Field of the Invention

The present invention relates to an image processing apparatus.

2. Description of the Related Art

Detecting the resolution of an input image and automatically correcting the image is a known art. In U.S. Pat. No. 7,664,335 (Japanese Patent Application Publication No. 2006-166188), for example, Kurumisawa et al. describe an automatic image correction circuit that detects the resolution of an image by counting clock periods during the interval from the rise to the fall of an image data enable signal. The automatic image correction circuit then selects image correction parameters and calculates settings based on the detected resolution, and performs an image correction based on the selected parameters and calculated settings.

Counting clock periods during an image data enable signal is equivalent to counting pixels in the horizontal direction or scanning lines in the vertical direction. In effect, the resolution of the input image is detected from its horizontal and vertical pixel counts. A problem is that these pixel counts do not always reflect the actual resolution of the image. In particular, if the image is an enlarged version of a low-resolution image, its actual resolution is lower than the resolution indicated by the pixel counts. An image of this type cannot be processed correctly if it is corrected on the basis of its pixel counts.

SUMMARY OF THE INVENTION

An image processing apparatus according to the present invention includes an image analyzer that obtains a resolution discrimination signal by analyzing variations in the values of pixels spaced at prescribed intervals to determine the extent to which an input image includes signal components with frequencies equal to or greater than a frequency determined by the prescribed intervals.

The input image can then be processed according to its actual resolution.

BRIEF DESCRIPTION OF THE DRAWINGS

In the attached drawings:

FIG. 4 is a diagram illustrating pixel coordinates in an input image received by an image processing apparatus according to the invention;

DETAILED DESCRIPTION OF THE INVENTION

Figure 1:
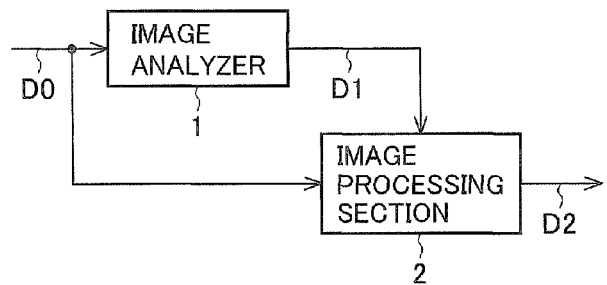
FIG. 1 is a block diagram of an image processing apparatus according to a first embodiment of the invention.

Embodiments of the invention will now be described with reference to the attached drawings, in which like elements are indicated by like reference characters.

First Embodiment

Referring to FIG. 1, the image processing apparatus according to the first embodiment of the invention includes an image analyzer 1 that determines the resolution of an input image D0 and an image processing section 2 that processes the input image D0 according to the determined resolution to obtain an output image D2.

The image analyzer 1 determines the resolution of the input image D0 from the pixel values of the input image D0, and outputs a resolution discrimination signal D1 as a result. The image processing section 2 uses the resolution discrimination signal D1 to carry out various processing on the input image D0, such as noise reduction and enhancement processing, and outputs the output image D2 obtained as a result. The image processing section 2 processes the input image D0 in different ways depending on the value of the resolution discrimination signal D1.

The image analyzer 1 finds the resolution by analyzing variations in the values of pixels spaced at prescribed intervals in the input image D0 to determine the extent to which the input image D0 includes signal components with frequencies equal to or greater than a particular frequency determined by the prescribed intervals; details will be given below.

Figure 2:
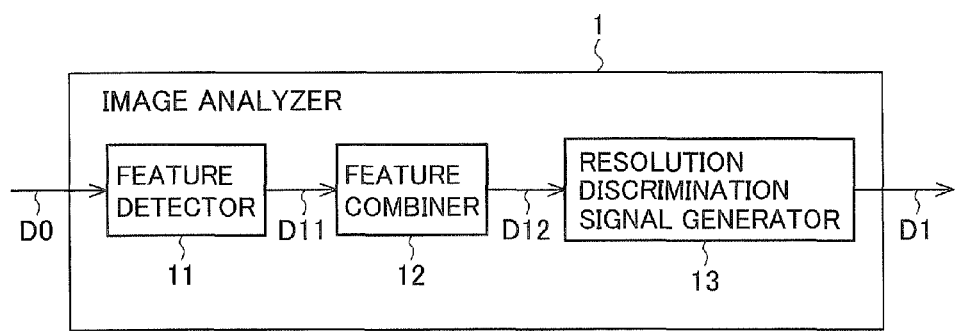
FIG. 2 is a block diagram of the image analyzer in the image processing apparatus according to the first embodiment.

Referring to FIG. 2, the image analyzer 1 includes a feature detector 11, a feature combiner 12, and a resolution discrimination signal generator 13.

First, the feature detector 11 will be described. For each pixel in a prescribed area of the input image D0, the feature detector 11 designates a plurality of pixels disposed, with reference to that pixel, at the prescribed intervals as a pixel group of interest, and determines and outputs a representative difference value D11 obtained from variations in the pixel values of the pixels constituting the designated pixel group of interest by performing processing described below.

Figure 3:
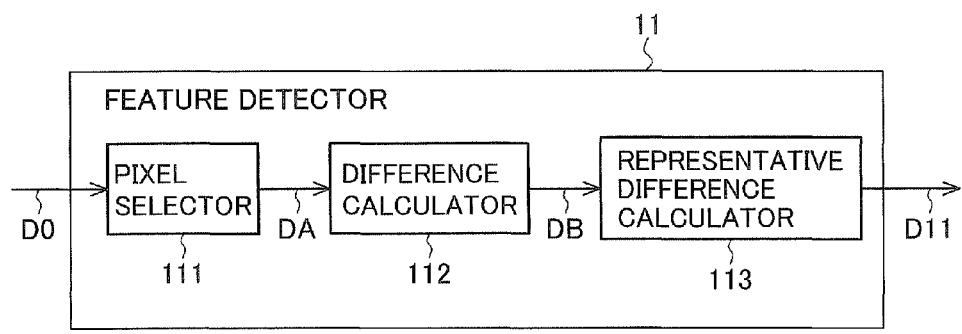
FIG. 3 is a block diagram of the feature detector in the image processing apparatus according to the first embodiment.

Referring to FIG. 3, the feature detector 11 includes a pixel selector 111, a difference calculator 112, and a representative difference calculator 113.

For each pixel in the prescribed area of the input image D0, the pixel selector 111 outputs the pixel values of the pixels constituting the pixel group of interest designated for the pixel as pixel value data DA.

The pixel value data DA of the pixel group of interest and the operation of the pixel selector 111 will be described with reference to FIG. 4, which schematically shows the input image D0 and the pixels constituting the input image D0. The smallest squares in FIG. 4 represent pixels. The positions of a pixel in the horizontal and vertical directions of the input image D0 are defined as its horizontal coordinate and vertical coordinate. A pixel positioned at horizontal coordinate x and vertical coordinate y has a pixel value d(x, y). The intervals between scale marks on the horizontal and vertical coordinate axes are assumed to be equal to the intervals between pixels in the input image D0. In the example shown in FIG. 4, the input image D0 has W pixels in the horizontal direction and H pixels in the vertical direction.

If the pixel positioned at horizontal coordinate x and vertical coordinate y in FIG. 4 is denoted (x, y), then for each pixel in the rectangular area R with vertices at the four pixels (a, b), (p, b), (a, q), (p, q), the pixel selector 111 designates a pixel group of interest and obtains the pixel value data DA of the pixel group of interest. For each pixel in the area R, the pixel group of interest has four pixels aligned, with reference to that pixel, at one-pixel intervals in the horizontal direction. The pixel group of interest of the pixel of interest denoted (u, v) includes the four pixels (u, v), (u+1, v), (u+2, v), and (u+3, v). The pixel value data DA of this pixel group of interest include the pixel values d(u, v), d(u+1, v), d(u+2, v), and d(u+3, v).

If the area R is defined so as to leave at least three pixels between it and the right edge of the screen, case classification processes such as determining whether pixel (u+3, v) exists are unnecessary and the processing is simplified. The designated area R preferably includes the middle of the screen, which the viewer looks at frequently. A small area R increases the speed of the resolution discrimination process, while a large area R enables the resolution of the image to be discriminated more accurately.

The operation of the difference calculator 112 will now be described. For each pair of mutually adjacent pixels among the four pixels, the difference calculator 112 calculates one difference (variation in pixel values). The difference calculator 112 calculates differences S(1), S(2), and S(3) by the following equations, and outputs the resulting difference data DB.

$$S(1)=d(u+1,v)-d(u,v)$$

$$S(2)=d(u+2,v)-d(u+1,v)$$

$$S(3)=d(u+3,v)-d(u+2,v)$$

When the differences S(1), S(2), and S(3) in the difference data DB have an alternating pattern of positive and negative values, the representative difference calculator 113 outputs a non-zero value, for example, the minimum absolute value of S(1), S(2), and S(3), as the representative difference value D11. In other cases, zero is output as the representative difference value D11.

More specifically, when S(1) has a positive value, S(2) has a negative value, and S(3) has a positive value, or when S(1) has a negative value, S(2) has a positive value, and S(3) has a negative value, the representative difference calculator 113 outputs the minimum absolute value of S(1), S(2), and S(3) as the representative difference value D11. In other cases, zero is output as the representative difference value D11.

For each pixel in the area R, the feature detector 11 outputs the representative difference value D11 obtained by this procedure. In the example in FIG. 4, since there are (p−a+1)×(q−b+1) pixels in the area R, the feature detector 11 outputs (p−a+1)×(q−b+1) representative difference values D11.

Next the operation of the feature combiner 12 will be described. The feature combiner 12 outputs a combined feature value obtained by combining the representative difference values D11 output from the feature detector 11 as combined feature data D12. The feature combiner 12 outputs the value obtained by adding the (p−a+1)×(q−b+1) representative difference values D11 as the combined feature data D12.

Next the operation of the resolution discrimination signal generator 13 will be described. The resolution discrimination signal generator 13 outputs a resolution discrimination signal D1 having a monotonic non-decreasing relationship to the combined feature data D12.

Monotonic non-decreasing means that the following condition is satisfied. Let D12X and D12Y be two values of the combined feature data D12. If the output resolution discrimination signal D1 has the value D1X when the combined feature data D12 has the value D12X, and the value D1Y when the combined feature data D12 has the value D12Y, and if D12X is less than D12Y (D12X<D12Y), then D1X is equal to or less than D1Y (D1X≤D1Y).

Figure 5A:
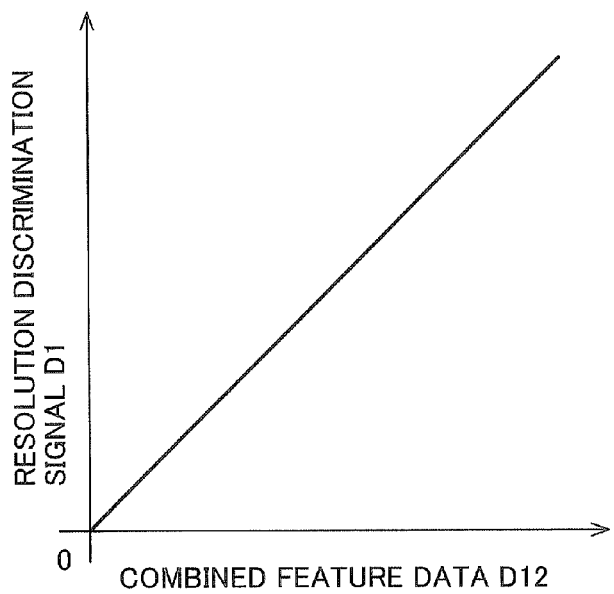
FIGS. 5A and 5B are graphs illustrating the operation of the resolution discrimination signal generator in the image processing apparatus according to the first embodiment.
Figure 5B:
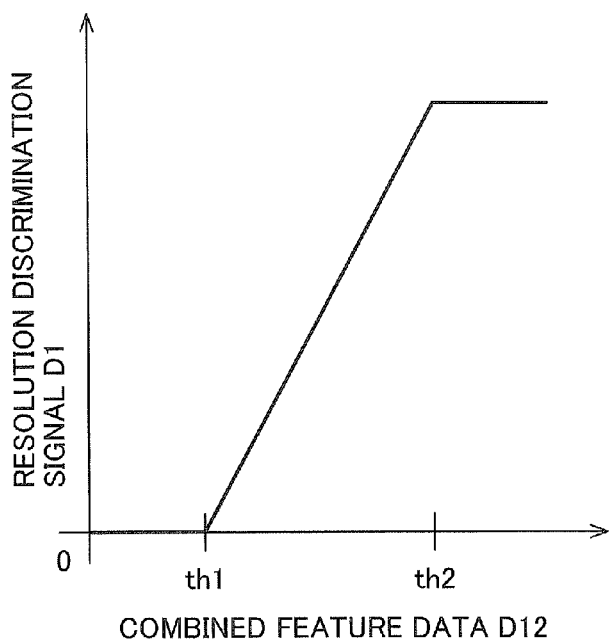

In FIG. 5A, the resolution discrimination signal generator 13 outputs a resolution discrimination signal D1 proportional to the combined feature data D12. In FIG. 5B, the resolution discrimination signal generator 13 operates so that when the combined feature data D12 have a value equal to or less than a threshold value th1, the resolution discrimination signal D1 is zero, when the combined feature data D12 have values between threshold values th1 and th2, the resolution discrimination signal D1 is a linear function of the combined feature data D12, and when the combined feature data D12 have values equal to or greater than threshold value th2, the resolution discrimination signal D1 has a constant value.

Since the combined feature data D12 is the sum of many representative difference values D11, the combined feature data D12 has a large value that must be expressed by a large number of bits. The resolution discrimination signal D1 has a prescribed number of bits (for example, eight bits). By converting the combined feature data D12 to a resolution discrimination signal D1 and maintaining a monotonic non-decreasing relationship, the image processing section 2 can obtain a resolution discrimination signal D1 that is easy to process.

The operation and effect of the image analyzer 1 and the effect of the image processing apparatus according to the first embodiment of the invention will be described below.

Figure 6:
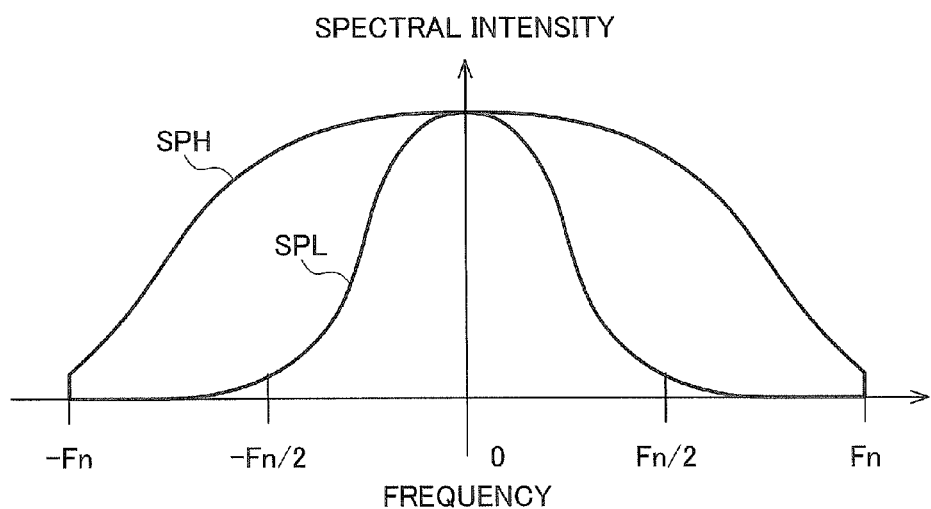
FIG. 6 illustrates frequency spectra of input images received by the image processing apparatus.

In the frequency spectra shown in FIG. 6, Fn represents the Nyquist frequency, which is determined by the number of pixels per unit length of the input image D0. When the input image D0 is just a signal with frequency Fn, the pixel values alternately take positive values and like negative values in both the horizontal and vertical directions.

Because the spectral intensity of the input image D0 is defined for each dot in a frequency plane having two frequency axes, corresponding to horizontal and vertical frequencies, a three-dimensional space would have to be used to describe the shape of the spectra accurately. Because the shape is isotropic around the origin of the frequency axes, however, the shape can be shown schematically by using one frequency axis. Only one frequency axis is therefore used in FIG. 6. When the pixel spacing differs in the horizontal and vertical directions, however, both the horizontal and vertical frequencies must be considered.

The spectral intensity of the input image D0 generally peaks at the origin (where the frequency is zero), and decreases as the frequency increases. When an image is taken by using, an imaging device, the image does not include components with frequencies greater than the Nyquist frequency determined by the number of pixels per unit length of the imaging device. The frequency spectrum of the input image D0 therefore has at least a moderate spectral intensity level up to the band of frequencies near ±Fn, but drops to zero at frequencies with absolute values equal to or greater than Fn, as in spectrum SPH.

Depending on the input image D0, however, the frequency spectrum may have a shape different from spectrum SPH. As a typical example, the input image D0 may be obtained by enlarging an image with fewer pixels than the input image D0. If, for example, the input image D0 is obtained by enlarging an image with W/2 pixels in the horizontal direction and H/2 pixels in the vertical direction by a factor of two in the horizontal and vertical directions, the frequency spectrum of the input image D0 has the shape of spectrum SPL. More specifically, the spectrum maintains at least a moderate spectral intensity level up to the band of frequencies near ±Fn/2, but is substantially zero in the bands of frequencies with absolute values sufficiently greater than Fn/2.

The case in which enhancement processing is carried out in the image processing section 2 will now be considered. A simple enhancement process is implemented by taking components with high frequencies near a particular frequency band of the input image D0, amplifying the frequencies with a prescribed gain, and adding the amplified components to the input image D0. The reason behind this process is that it increases the spectral intensity of the high-frequency components of the input image D0. A high-pass filter, a bandpass filter, or the like can be used to extract components with frequencies near a particular frequency band.

When the frequency spectrum of the input image D0 is shaped like spectrum SPH, the spectral intensity of the high-frequency components can be increased by extracting the components with frequencies in a prescribed band with absolute frequency values equal to or greater than about Fn/2 and equal to or less than Fn, amplifying these components with a prescribed gain, and adding them to the input image D0.

When the frequency spectrum of the input image D0 has a shape like spectrum SPL, the input image D0 includes few frequency components in the prescribed band with absolute frequency values equal to or greater than about Fn/2 and equal to or less than Fn, so extracting components with frequencies in this band has little effect. Instead, for example, taking components with frequencies in a prescribed band with absolute frequency values equal to or greater than about Fn/4 and equal to or less than Fn/2, amplifying these components with a prescribed gain, and adding them to the input image D0 would be more effective.

Summing up, although the input image D0 with spectrum SPH and the input image D0 with spectrum SPL have the same number of pixels, because of their frequency spectra are spread to different extents, to be processed effectively they should be processed in different ways. Therefore, the image processing section 2 preferably processes the input image D0 in different ways, by altering the frequency response of a high-pass filter, for example, depending on the profile of the frequency spectrum of the input image D0 instead of its pixel count.

Instead of altering the frequency response of a high-pass filter, the gain applied to the extracted frequency components may be controlled. For example, the high-pass filter may be designed to extract components with high frequencies in the bands of frequencies with absolute values equal to or greater than values near Fn/2, but the gain value may be low for an input image with a frequency spectrum shaped like spectrum SPH and high for an input image with a frequency spectrum shaped like spectrum SPL.

In other words, the input image D0 can be processed according to its actual resolution by obtaining a signal indicating the frequency band out to which the frequency spectrum of the input image D0 spreads, or whether the spectrum spreads to a prescribed frequency band.

In order to calculate the frequency spectrum of the input image D0 accurately, however, a Fourier transform must be performed on the input image D0, and this requires an enormous amount of computation. In order to implement processing in which the image processing section 2 performs computations in different ways depending on the spread of the frequency spectrum of the input image D0, it is therefore necessary to estimate how far the frequency spectrum of the input image D0 spreads by a method other than the Fourier transform.

According to the image analyzer 1 in the first embodiment of the present invention, the spread of the frequency spectrum of the input image D0 can be estimated by a simple computation. In the image analyzer 1 in the first embodiment of the present invention, the image processing section 2 can therefore perform computations in different ways depending on the spread of the frequency spectrum of the input image D0.

That the amount of computation performed in the image analyzer 1 is less than the amount needed to perform a Fourier transform on the input image D0 will be clear to those skilled in the art from the description of the first embodiment. The following description will accordingly show that the image analyzer 1 can estimate the shape of the frequency spectrum of the input image.

Figure 7:
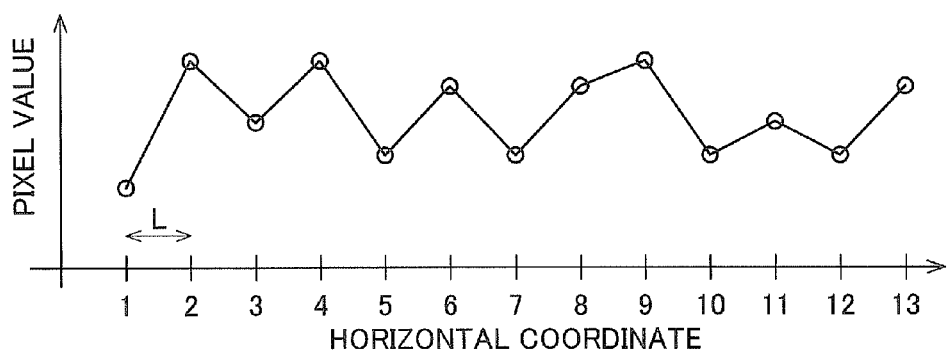
FIGS. 7 and 8 illustrate variations in pixel values in an input image received by the image processing apparatus according to the first embodiment.
Figure 8:
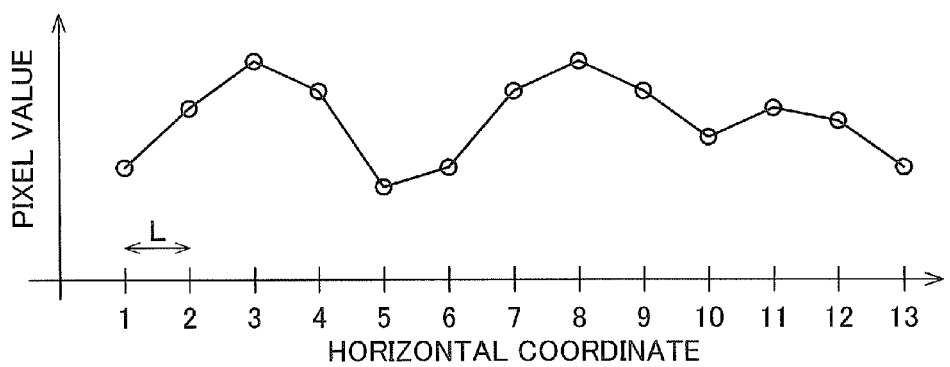

The polylines in FIGS. 7 and 8 illustrate pixel values of the input image D0 by showing data plotted for thirteen pixels in the horizontal direction. FIG. 7 shows an example in which the pixel value variations include many variations that can be approximated by sinewaves with frequencies of about ±Fn. FIG. 8 shows an example in which the pixel value variations include many variations that can be approximated by sinewaves with frequencies of about ±Fn/2. In FIGS. 7 and 8, L represents the distance between pixels in the input image D0.

It will be assumed below that for each pixel with a horizontal coordinate from 1 to 10 in FIGS. 7 and 8, the feature detector 11 designates a pixel group by the procedure described above and determines a representative difference value D11. Taking differences between the pixel values of mutually adjacent pixels in FIG. 7 gives the result in FIG. 9. Taking differences in FIG. 8 gives the result in FIG. 10.

Figure 9:
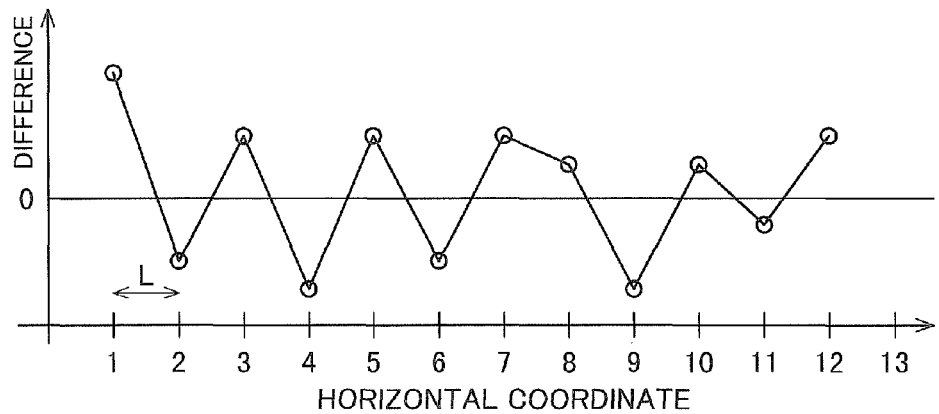
FIG. 9 illustrates differences between the pixel values in the input image in FIG. 7.

As is apparent from the differences in FIG. 9, in the exemplary pixel values in FIG. 7, the pixel groups for which three successive differences have an alternating pattern of positive and negative signs (+−+, or −+−) and the representative difference value D11 has a non-zero value are as follows:

the pixel group designated for the pixel positioned at horizontal coordinate 1;

the pixel group designated for the pixel positioned at horizontal coordinate 2 the pixel group designated for the pixel positioned at horizontal coordinate 3;

the pixel group designated for the pixel positioned at horizontal coordinate 4;

the pixel group designated for the pixel positioned at horizontal coordinate 5;

the pixel group designated for the pixel positioned at horizontal coordinate 8;

the pixel group designated for the pixel positioned at horizontal coordinate 9;

the pixel group designated for the pixel positioned at horizontal coordinate 10.

Because most of the representative difference values D11 have non-zero values, the value of the combined feature data D12 obtained by adding the representative difference values D11 is fairly large.

Figure 10:
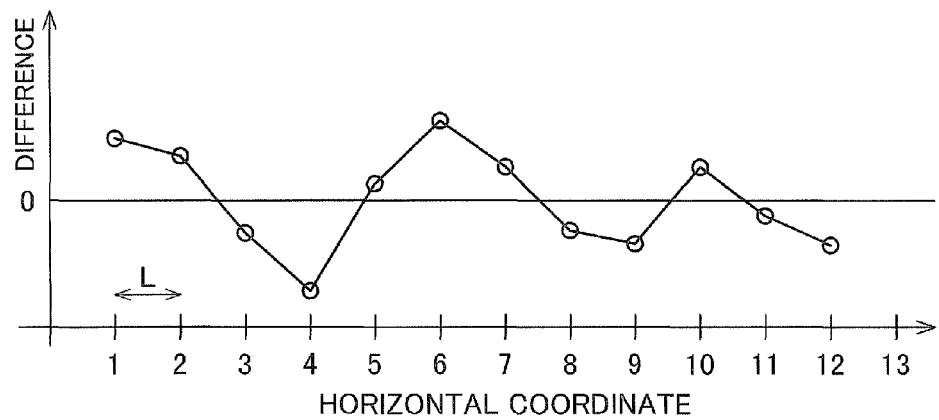
FIG. 10 illustrates differences between the pixel values in the input image in FIG. 8.

As is apparent from the differences in FIG. 10, in the exemplary pixel values in FIG. 8, the only pixel group for which the calculated representative difference value D11 has a non-zero value is:

the pixel group designated for the pixel positioned at horizontal coordinate 9.

The representative difference value D11 now has a non-zero value for only one pixel out of ten, so the value of the combined feature data D12 obtained by adding the representative difference values D11 is not large.

As shown in the exemplary pixel values in FIGS. 7 and 8, when the pixel value variations in the input image D0 include many components that can be approximated by sinewaves with frequencies with absolute values of about Fn, the value of the combined feature data D12 is large, but when the pixel value variations in the input image D0 include many components that can be approximated by sinewaves with frequencies with absolute values less than Fn, for example, about Fn/2, the value of the combined feature data D12 is not so large. The considerations below show that the more components that can be approximated by sinewaves with frequencies with absolute values greater than about Fn/2 there are in the pixel value variations in the input image D0, the higher the value of the combined feature data D12 becomes.

When the input image D0 includes components with frequencies of $\pm\beta*Fn$ (referred to as frequencies of interest, $0<\beta\leq 1$), the difference S also includes components with these frequencies of interest. Assuming below that the difference S includes only components with the frequencies of interest, if the phase of the middle one of three successive differences S is $\alpha$ (equal to or greater than zero and less than $\pi$), the phases of the three successive differences S are $-\pi\beta+\alpha$, $\alpha$, and $\pi\beta+\alpha$.

The condition that makes the three differences S have an alternating pattern of positive and negative signs is as follows.

$$-\pi<-\pi\beta+\alpha<0<\alpha<\pi<\pi\beta+\alpha<2\pi \quad (1)$$

The following condition (2) follows from condition (1).

$$\tfrac{1}{2}<\beta\leq 1 \text{ and } \pi(1-\beta)<\alpha<\pi\beta \quad (2)$$

It is apparent from condition (2) that if $\beta$ is greater than one-half, as $\beta$ approaches one the probability that the three differences S have an alternating pattern of positive and negative signs increases (to almost 100 percent when $\beta=1$). It is also apparent that when the differences S include only components with those of the frequencies of interest having absolute values equal to or less than Fn/2, the three successive differences S should not have an alternating pattern of positive and negative signs. In practice, the input image D0 includes frequencies other than the frequencies of interest, and even when there are only frequency components with absolute values equal to or less than Fn/2, three successive differences S may sometimes have an alternating pattern of positive and negative signs, but a low frequency decreases the probability that three successive differences S will have an alternating pattern of positive and negative signs.

The case in which the three successive differences S have an alternating pattern of positive and negative signs, even though there are only frequencies with absolute values equal to or less than Fn/2, because the signal components include both the frequencies of interest and another frequency component (frequency $\gamma$Fn, phase $\delta$), will now be considered.

$$S(x)=\sin(\pi\beta*x+\alpha)+b*\sin(\pi\gamma*x+\delta) \quad (3)$$

Here, x represents pixel position. Pixels x and x+1 are mutually adjacent. When $\gamma$ is sufficiently small and changes only slightly during one cycle of the frequencies of interest, if the second term on the right side of equation (3) is replaced with a variable (−c), the result becomes.

$$S(x)+c=\sin(\pi\beta*x+\alpha) \quad (4)$$

Only one frequency $\gamma$Fn is shown in equation (3), but the effect of all components with low frequencies (all frequencies equal to or less than some fraction of $\beta$) can be expressed as the variable c. Since the difference S corresponds to the first derivative of the pixel values, for the same amplitude, a low frequency decreases the differences S. Since a spectral distribution like the ones shown in FIG. 6 is being assumed, as $\beta$ increases, higher frequencies appear in the low-frequency component and the possible values of the variable c become larger.

Figure 11:
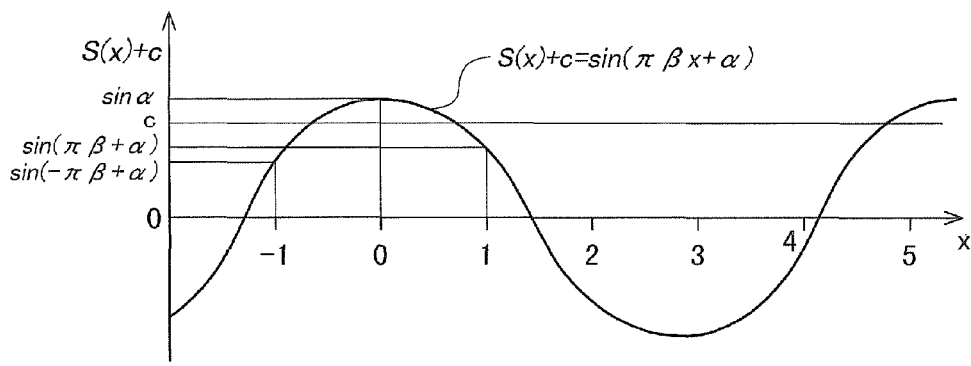
FIG. 11 illustrates the effect of a low frequency component on the sign alternation of the differences in pixel values in the image processing apparatus according to the first embodiment.

Equation (4) near x=0 is shown in FIG. 11, in which the signs of the differences S(x) are negative, positive, and negative (−+−) for three pixels x=−1, 0, and 1. The conditions that make the differences have an alternating pattern of positive and negative signs for three pixels are as follows. Details will be omitted.

$$\pi(1-\beta)/2<\alpha\leq\pi/2 \text{ and } \sin(\pi\beta+\alpha)<c<\sin(\alpha) \quad (5A)$$

$$\pi/2\leq\alpha<\pi(1+\beta)/2 \text{ and } \sin(-\pi\beta+\alpha)<c<\sin(\alpha) \quad (5B)$$

It is apparent from conditions (5A) and (5B) that even when $\beta$ is close to zero, the differences may have an alternating pattern of positive and negative signs for three pixels. As $\beta$ increases, the range of values of $\alpha$ in which the differences have an alternating pattern of positive and negative signs for three pixels becomes wider, and if $\alpha$ is fixed, the range of the variable c becomes wider. For the same value of $\beta$, as $\alpha$ approaches $\pi/2$ the range of the variable c in which the differences have an alternating pattern of positive and negative signs for three pixels becomes wider.

Frequencies corresponding to values of β close to zero have some effect on the value of the representative difference value D11, but frequencies corresponding to values of β close to zero have considerably less effect than frequencies corresponding to values of β sufficiently exceeding ½.

The description above shows that when the resolution discrimination signal D1 has a non-zero value because three successive differences S have an alternating pattern of positive and negative signs, its value is obtained by taking a sum of frequencies with absolute values equal to or greater than about Fn/2 (including frequencies lower than Fn/2) multiplied by weighting coefficients that increase with increasing frequency. It is apparent that the more components that can be approximated by sinewaves with frequencies with absolute values equal to or greater than about Fn/2 there are in the pixel value variations in the input image D0, the higher the value of the combined feature data D12 becomes.

Since the resolution discrimination signal D1 has a monotonic non-decreasing relationship to the combined feature data D12, the more components that can be approximated by sinewaves with frequencies with absolute values equal to or greater than about Fn/2 there are in the pixel value variations in the input image D0, the higher the value of the resolution discrimination signal D1 also becomes. When the pixel value variations in the input image D0 include many components that can be approximated by sinewaves with frequencies with absolute values equal to or greater than about Fn/2, the frequency spectrum of the input image D0 spreads out to the band of frequencies with absolute values equal to or greater than Fn/2. The frequency band out to which the frequency spectrum of the input image D0 spreads can be therefore estimated from the value of the resolution discrimination signal D1.

Since the frequency band out to which the frequency spectrum of the input image D0 spreads can be estimated from the value of the resolution discrimination signal D1, the input image D0 can be processed in different ways depending on the frequency spectrum of the input image D0 by using the value of the resolution discrimination signal D1.

In the description above, the value of the resolution discrimination signal D1 becomes large when the pixel value variations in the input image D0 include many components that can be approximated by sinewaves with frequencies with absolute values equal to or greater than Fn/2, but the frequency band to which the resolution discrimination signal D1 responds is not restricted to this exemplary frequency band. If the pixel group of interest includes pixels spaced at wider intervals, the resolution discrimination signal D1 can respond to a band of frequencies with absolute values less than Fn/2.

An exemplary case in which the extent to which the frequency spectrum of the input image D0 includes components with frequencies with absolute values equal to or greater than about Fn/4 and equal to or less than about Fn/2 is determined will be described below. For each pixel of interest in the area R, the pixel group of interest has four pixels spaced at two-pixel intervals in the horizontal direction, based at the pixel of interest.

The pixel group of interest of the pixel of interest denoted (u, v) includes the four pixels (u, v), (u+2, v), (u+4, v), and (u+6, v).

The pixel value data DA of this pixel group of interest include the pixel values d(u, v), d(u+2, v), d(u+4, v), and d(u+6, v).

The difference data DB include differences S(1), S(2), and S(3) expressed by the following equations.

$$S(1)=d(u+2,v)-d(u,v)$$

$$S(2)=d(u+4,v)-d(u+2,v)$$

$$S(3)=d(u+6,v)-d(u+4,v)$$

Figure 12:
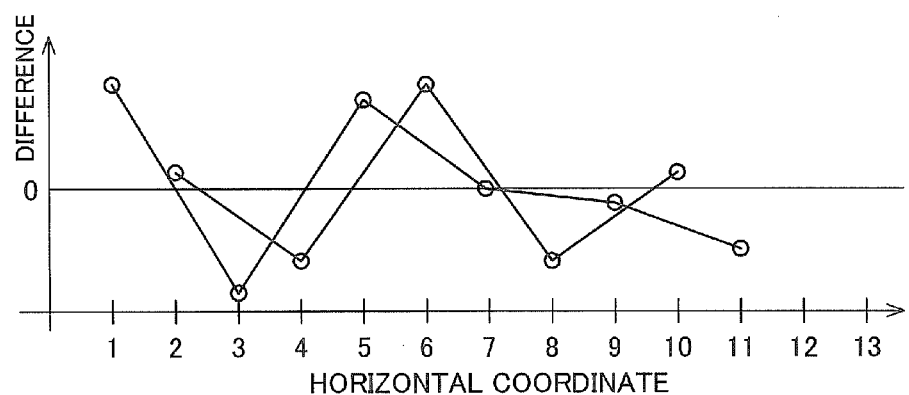
FIG. 12 illustrates differences between the values of pixels spaced two pixels apart in the input image in FIG. 8.

When the components with absolute frequency values equal to or greater than about Fn/4 and equal to or less than about Fn/2 in the frequency spectrum of the input image D0 include especially many components with frequencies near ±Fn/2, variations that can be approximated by sinewaves with cycles of about 4L appear in the pixel value variations in the input image D0, as shown in FIG. 8. Differences between the values of pixels spaced two pixels apart in FIG. 8 are shown in FIG. 12.

As is apparent from FIG. 12, when a representative difference value D11 is determined for each pixel with a horizontal coordinate from 1 to 7 in FIG. 8, the pixel groups for which the calculated representative difference value D11 has a non-zero value are as follows:

horizontal coordinate 1;
horizontal coordinate 2;
horizontal coordinate 4;
horizontal coordinate 6.

It is apparent that more non-zero representative difference values D11 are obtained by taking differences between values of pixels spaced two pixels apart than by taking differences between values of mutually adjacent pixels. The value of the combined feature data D12 becomes moderate and the value of the resolution discrimination signal D1 becomes large. The extent to which the frequency spectrum of the input image D0 includes components that can be approximated by sinewaves with absolute frequency values equal to or greater than about Fn/4 and equal to or less than about Fn/2 can therefore be determined from the resolution discrimination signal D1.

The exemplary case above shows that when, for each pixel of interest in the area R, the pixel group of interest has four pixels spaced at two-pixel intervals in the horizontal direction, based at the pixel of interest, whether the frequency spectrum of the input image D0 spreads out to a band of frequencies from a frequency equal to or greater than at least about ±Fn/4 to a frequency near ±Fn/2 is determined.

The description above shows that in the image analyzer 1, the pixels constituting the pixel group of interest may be spaced at different intervals depending on the frequency band out to which it is desired to know whether the frequency spectrum of the input image D0 spreads or not. As the frequency band of interest shifts toward lower frequencies, the intervals between the pixels constituting each pixel group of interest should be widened.

The pixel group of interest may have three, five, or more than five pixels instead of the four pixels used in the description above. A higher resolution discrimination signal D1 is easy to obtain if the pixel groups of interest include only three pixels. The components with absolute frequency values equal to or less than Fn/2, however, are then added into the resolution discrimination signal D1 in a larger proportion than for pixel groups of interest with four pixels. For pixel groups of interest with five or more pixels, fewer components with absolute frequency values at a distance from Fn are added than for pixel groups of interest with four pixels, and components with absolute frequency values closer to Fn can be added to the resolution discrimination signal D1 with increasing weight. For pixel groups of interest with five pixels, frequencies with absolute values equal to or greater than about Fn*(⅔) are mainly detected.

Instead of being aligned in the horizontal direction, the pixels of the pixel group of interest but may be aligned in the vertical direction, or spaced at prescribed intervals in a diagonal direction, such as at P-pixel intervals in the horizontal direction and at Q-pixel intervals in the vertical direction, where P and Q are positive integers.

The pixels may be spaced at different intervals within each pixel group of interest. For example, the pixel group of interest of the pixel of interest (u, v) may include pixels (u, v), (u+2, v), (u+3, v), (u+4, v), and (u+6, v). When the four differences have a pattern of positive, negative, negative, and positive signs (+--+), or a pattern of negative, positive, positive, and negative signs (-++-), the representative difference value D11 has a non-zero value. A prescribed pattern for the difference data DB when the representative difference value D11 has a non-zero value may be decided according to the disposition of the pixels constituting the pixel group of interest so that signal components with frequencies equal to or greater than a prescribed frequency can be detected, as described above.

The pixel of interest need not be the pixel at the left end of the pixel group of interest as in the description above. The pixel group of interest of the pixel of interest (u, v) may include, for example, pixels (u-1, v), (u, v), (u+1, v), and (u+2, v). The pixel group of interest need not even include the pixel of interest; for example, the pixel group with pixels (u-1, v), (u+1, v), (u+3, v), and (u+5, v) may be used as the pixel group of interest of pixel (u, v). The pixel group of interest need only be positioned with reference to the pixel of interest and include pixels spaced at prescribed intervals in a prescribed direction.

Generalizing from the above, the pixel selector 111 may take each pixel in an area R as a pixel of interest and select N pixels aligned, with reference to the pixel of interest, at prescribed intervals in a prescribed direction as a pixel group of interest. The pixel value data DA include the N pixel values of the N pixels constituting the pixel group of interest.

If the N pixel values constituting the pixel value data DA are denoted D(j), where the variable j is an integer that varies from 1 to N in order of proximity to the pixel of interest (typically, D(1) is the pixel value of the pixel of interest and D(N) is the pixel value of the pixel farthest from the pixel of interest), then the difference data DB include (N-1) differences S(k), where the variable k is an integer with values from 1 to N-1, and S(k) is expressed by the following equation:

$$S(k)=D(k+1)-D(k)$$

If the differences S(k), when arranged in ascending or descending order of k, have a prescribed pattern (for example, an alternating pattern of positive and negative values), the representative difference value D11 output from the representative difference calculator 113 can be given a positive value, such as the minimum absolute value of the differences S(k). In other cases, D11 is zero.

As a variation of the representative difference calculator 113, the condition may be added that when the differences S(k) are arranged in order of k and the minimum absolute value of the differences S(k) is equal to or less than a first threshold value, even if the differences S(k) have an alternating pattern of positive and negative values, zero is output as the representative difference value D11.

This variation removes the effect of noise in the input image D0. If the input image D0 includes noise, it appears as minute oscillations in the pixel values (or luminance values). If the pixel selector 111 designates an area with such minute oscillations of pixel values as the pixel group of interest, the representative difference calculator 113 might output a non-zero value due to noise.

When the variations in the pixel values in the pixel group of interest are due to minute oscillations, however, the absolute values of the differences S(k) can be treated as negligibly small. If the minimum absolute value of the differences S(k) is equal to or less than a prescribed threshold value (referred to as a zero-equivalent threshold value), the representative difference calculator 113 outputs zero even if the differences S(k) have an alternating pattern of positive and negative values when arranged in order of k, so as not to output a non-zero value caused by minute oscillations due to noise. In other words, the effect of noise in the input image D0 is removed. The zero-equivalent threshold value should be adjusted to obtain proper output images for a large collection of anticipated input images.

As another variation of the representative difference calculator 113, the condition may be added that if the differences S(k) have an alternating pattern of positive and negative values when arranged in order of k but the minimum absolute value of the differences S(k) is equal to or greater than a prescribed threshold value (referred to as an upper limiting difference value), a fixed value, for example, the upper limiting difference value, is output as the representative difference value D11. The upper limiting difference value should be adjusted to obtain proper output images for a large collection of anticipated input images.

This variation removes the effect of an artificially added pattern in the input image D0.

A contemplated example is an input image D0 obtained by artificially combining a character string or like information with natural scenery or another natural image originally taken by a camera. If the pixel values of the input image are eight-bit values, their upper limit is 255 and their lower limit is zero.

Because there are normally few local rapid variations in pixel values in natural scenery, most of the representative difference values D11 will be considerably smaller than the difference between the upper and lower limits of the pixel values. Where a character string or like information is artificially added afterward, however, local pixel value variations extending across a wide part of the range between the upper and lower limits will be seen, since this makes the characters or other information more visible. The representative difference value D11 is therefore also likely to become extremely large.

From the above, when the value of the combined feature data D12 is calculated by adding the representative difference values D11, if the input image D0 includes an artificially added pattern such as a character string, because the representative difference values D11 output for this pattern are larger than other representative difference values, they are likely to have a greater effect on the calculation of the combined feature data D12.

The output of a fixed value, for example, the upper limiting difference value, as the calculated representative difference value D11 if the differences S(k) have an alternating pattern of positive and negative values when arranged in order of k but the minimum absolute value of the differences S(k) is equal to or greater than the upper limiting difference value can prevent the output of extremely large values of D11 even if the input image D0 includes an artificially added pattern, since the D11 values output for the pattern are at most equal to the upper limiting difference value.

Therefore, when the value of the combined feature data D12 is calculated by adding the representative difference values D11, even if the input image D0 includes an artificially added pattern, the representative difference values D11 output for the pattern are not inordinately greater than other D11 values. In other words, even if the input image D0 includes an artificially added pattern, the effect of the corresponding D11 values on the calculation of the combined feature data D12 can be mitigated to some extent.

In the example above, if the differences S(k) have an alternating pattern of positive and negative values when arranged in order of k, the representative difference calculator 113 selects a non-zero output value on the basis of the minimum absolute value of the differences S(k), but it is also possible to output a fixed non-zero value when the differences S(k) have an alternating pattern of positive and negative values.

The processing of the input image D0 carried out by the image processing section 2 is not restricted to enhancement processing, but may include other processing, such as noise reduction.

A simple noise reduction process is implemented by use of a low-pass filter. For example, a noise reduction effect is obtained by removing high frequency components with a low-pass filter.

Although the frequency spectrum may vary depending on the input image D0, noise reduction suited to the shape of the frequency spectrum of the input image D0 can be implemented by estimating the profile of the frequency spectrum of the input image D0 from the value of the resolution discrimination signal D1, and altering the frequency response of the low-pass filter as appropriate, depending on the result.

Alternatively, noise reduction may be implemented by adding the input image D0 to an image obtained by taking only low frequency components of the input image D0, both images being multiplied by respective weighting coefficients. In this case also, the frequency response of the low-pass filter may be altered depending on the value of the resolution discrimination signal D1. Alternatively, one or both of the weighting coefficients of the input image D0 and the image obtained by taking only its low frequency components may be altered depending on the value of the resolution discrimination signal D1.

It is also possible to treat differences S(k) having absolute values less than a prescribed value as zero, and to decide that the condition that the differences S(k) have an alternating pattern of positive and negative values is false when the differences S(k) include zero. If the prescribed value below which the differences S(k) are treated as zero is about the same as the anticipated noise or computational error, the effect of noise or computational error can be removed. The signal components with frequencies equal to or less than a particular frequency determined by the prescribed value then do not contribute to the output of non-zero representative difference values. The particular frequency increases with the prescribed value. The reason is that even if there are only signal components with frequencies equal to or less than the particular frequency, the probability is not zero that the differences S(k) will have an alternating pattern of positive and negative values, but the non-zero representative difference values will decrease as the particular frequency is decreased.

When the differences S(k) can take values of zero, the condition for output of a non-zero representative difference value may be a pattern in which differences S(k) having positive or zero values alternate with differences S(k) having negative or zero values. When the condition is satisfied due to a zero difference S(k), the representative difference value is the prescribed value multiplied by a prescribed factor (for example, a factor of 0.5).

The image analyzer may include a plurality of feature detectors that designate pixel groups of interest in different ways, and determine the resolution of the input image from feature values (representative difference values in the first embodiment) output from the feature detectors. The image processing apparatus may also include a plurality of image analyzers and determine the resolution of the input image from the values of a plurality of resolution discrimination signals.

The foregoing description also applies to the second to fourth embodiments. The descriptions given in each of the embodiments that follow are likewise applicable to the other embodiments.

Second Embodiment

Figure 13:
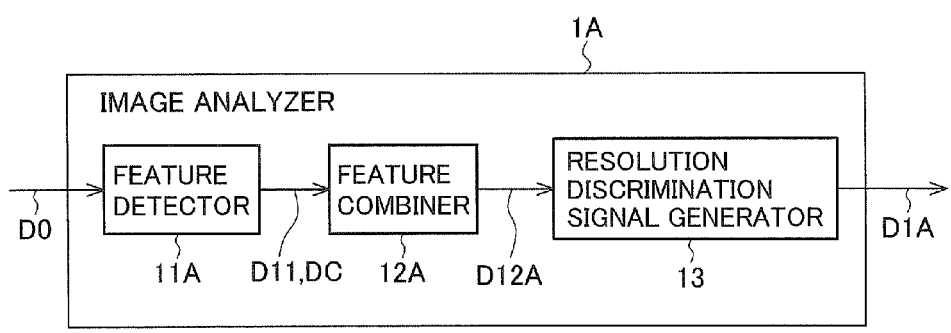
FIG. 13 is a block diagram of the image analyzer in the image processing apparatus according to a second embodiment of the invention.

The structure of the image analyzer of an image processing apparatus according to a second embodiment of the invention is shown in FIG. 13. When compared with the image processing apparatus in the first embodiment, this image analyzer 1A has a different feature detector 11A and a different feature combiner 12A.

Figure 14:
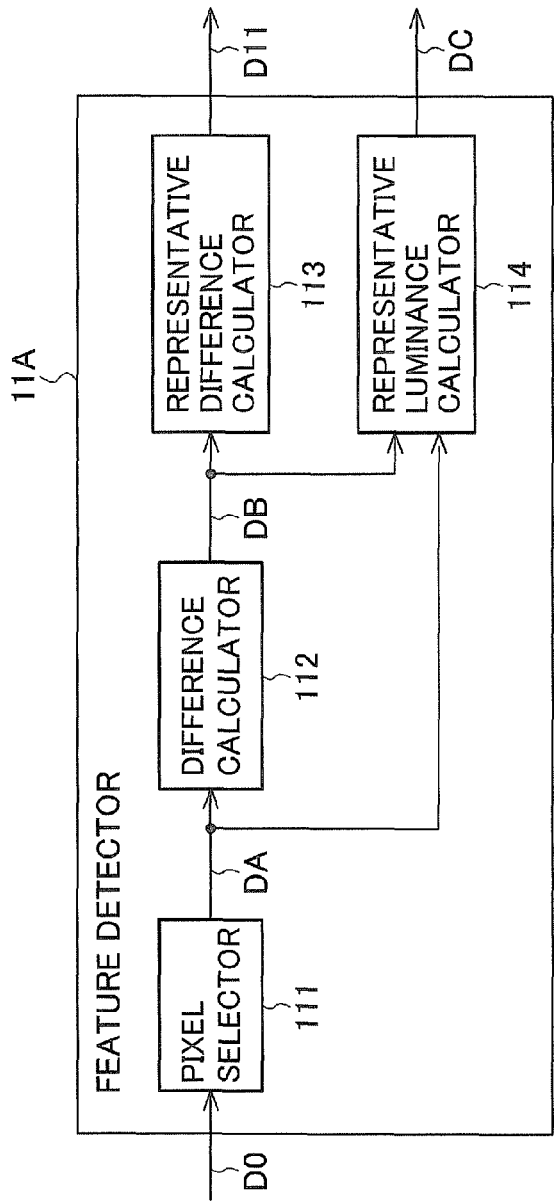
FIG. 14 is a block diagram of the feature detector in the image processing apparatus according to the second embodiment.

Referring to FIG. 14, the feature detector 11A includes a pixel selector 111, a difference calculator 112, a representative difference calculator 113, and a representative luminance calculator 114. The operation of the pixel selector 111, difference calculator 112, and representative difference calculator 113 in the second embodiment is the same as in the first embodiment.

From the N pixel values D(j) constituting the pixel value data DA, the representative luminance calculator 114 obtains and outputs a representative luminance value DC. The representative luminance value DC is the larger of the two pixel values of the pair of mutually adjacent pixels having the minimum absolute difference value in the pixel group of interest.

The notation D(j) for the N pixel values constituting the pixel value data DA is the same as in the first embodiment. The variable j is an integer that ranges from 1 to N. D(1) is the pixel value of the pixel of interest. D(N) is the pixel value of the pixel farthest from the pixel of interest.

The operation of the representative luminance calculator 114 will now be described in more detail.

If difference S(T) has the minimum absolute difference value among the difference values S(k) output from the difference calculator 112, the representative luminance calculator 114 outputs the larger of the two pixel values D(T) and D(T+1) as the representative luminance value DC. For every change in the pixel value data DA, the representative luminance value DC also changes.

The feature detector 11A outputs both the representative difference value D11 and the representative luminance value DC.

Next the operation of the feature combiner 12A will be described.

The feature combiner 12A obtains combined feature data D12A by taking a sum of representative difference values D11 multiplied by weighting coefficients. The weighting coefficients are determined from the representative luminance values DC. More specifically, the combined feature data D12A is obtained by taking a sum of the representative difference values D11 multiplied by weighting coefficients KA having a monotonic non-increasing relationship to the representative luminance values DC.

To say that the weighting coefficients KA have a monotonic non-increasing relationship to the representative luminance values DC means that the following condition is satisfied. Let DC0 and DC1 be any two representative luminance values DC. If the weighting coefficient KA has a value KA0 when the representative luminance value DC is DC0, and a value KA1 when the representative luminance value DC is DC1, and if DC0 is less than DC1 (DC0<DC1), then KA0 is equal to or greater than KA1 (KA0≥KA1).

Since the pixel value data DA are given for each pixel in an area R in the input image D0, a representative difference value D11 and a representative luminance value DC are obtained for each pixel in the area R in the input image D0. When the obtained representative difference value D11 of the pixel positioned at horizontal coordinate u and vertical coordinate v in FIG. 4 is denoted D11 (u, v), the representative luminance value DC is denoted DC(u, v), and the weighting coefficient KA obtained from the representative luminance value DC(u, v) is denoted KA(u, v), the combined feature data D12A is expressed by the following equation.

$$D12A = \sum_{u=a}^{p}\sum_{v=b}^{q} KA(u, v) * D1(u, v) \quad (6)$$

Figure 15A:
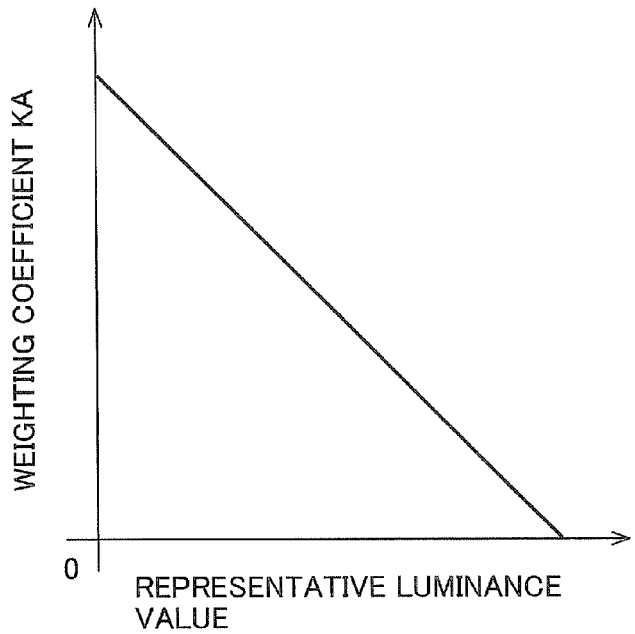
FIGS. 15A and 15B are graphs illustrating the derivation of weighting coefficients in the image processing apparatus according to the second embodiment.
Figure 15B:
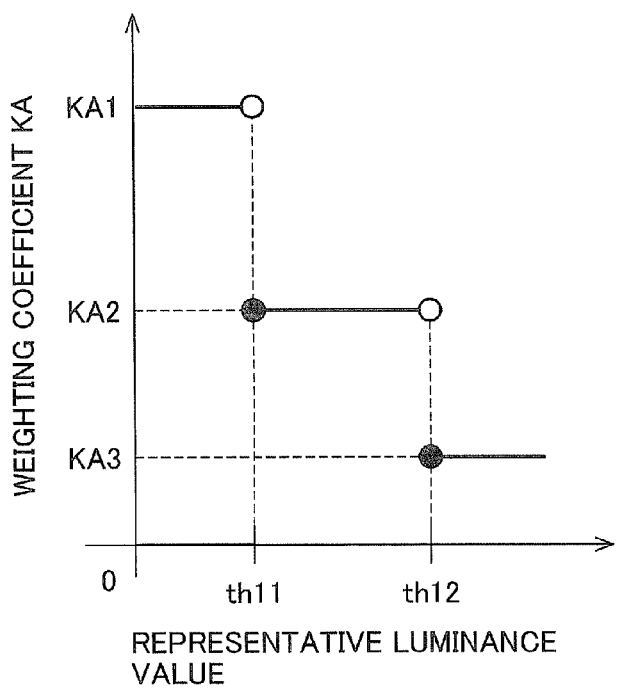

FIGS. 15A and 15B illustrate two exemplary monotonic non-increasing relationships, as defined above, between the representative luminance value DC and weighting coefficient KA. In the example in FIG. 15A, the weighting coefficient KA decreases constantly as the representative luminance value DC increases. In the example in FIG. 15B, when the representative luminance value DC is equal to or greater than zero and less than a threshold value th11, the weighting coefficient KA has a value KA1; when the representative luminance value DC is equal to or greater than the threshold value th11 and less than a threshold value th12, the weighting coefficient KA has a smaller value KA2; when the representative luminance value DC is equal to or greater than the threshold value th12, the weighting coefficient KA has a still smaller value KA3 (KA3<KA2<KA1).

The effect of the image processing apparatus according to the second embodiment will be described below with reference to FIG. 16 and FIGS. 17A to 17C.

Figure 16:
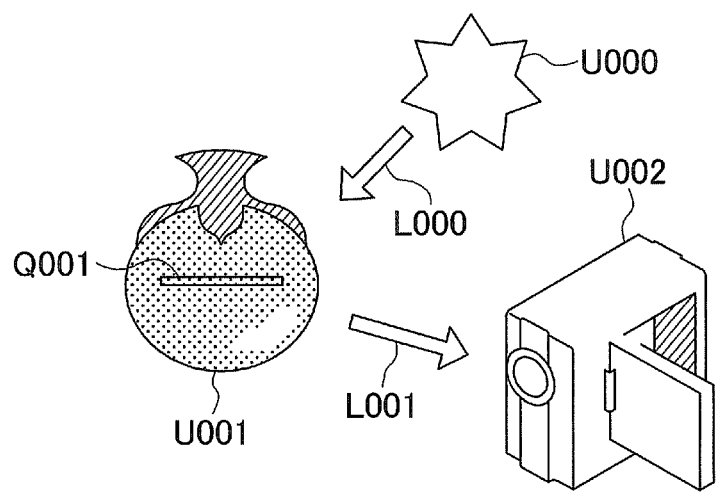
FIG. 16 illustrates an exemplary situation in which an input image is obtained by the image processing apparatus according to the second embodiment.

In FIG. 16, the input image D0 is obtained by shining light L000 from a lighting device U000 on an object U001, more specifically, a vase, and capturing the reflected light L001 with a camera U002. A pixel value of the input image D0 is expressed as the product of the brightness DU0 of the lighting device U000, the reflection coefficient DU1 of the object U001, and the sensitivity DU2 of the camera U002.

If the reflection coefficient of object U001 for pixel (u, v) in the input image D0 is denoted DU1 (u, v), the pixel value d(u, v) of pixel (u, v) in the input image D0 is expressed by the following equation.

$$d(u,v)=DU0*DU1(u,v)*DU2 \quad (7)$$

Given the relationship above, images of the same object captured with the same camera under lighting conditions of differing brightness will now be considered.

Reference characters Q0001 in FIG. 16 designate a part of the object U001 that appears as a straight line of pixels in the input image D0 captured by the camera U002.

Figure 17A:
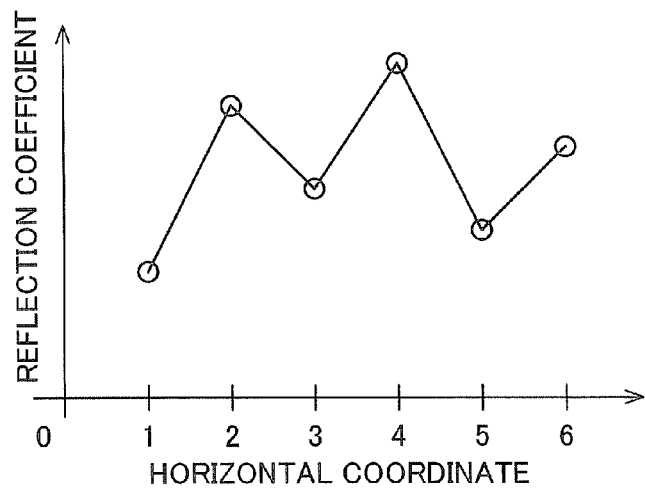
FIGS. 17A, 17B, and 17C illustrate image capture under different brightness conditions by the image processing apparatus according to the second embodiment.

In the horizontal direction in FIG. 17A, the reflection coefficients of this part Q001 are plotted at intervals matching the pixel intervals in the input image D0.

Figure 17B:
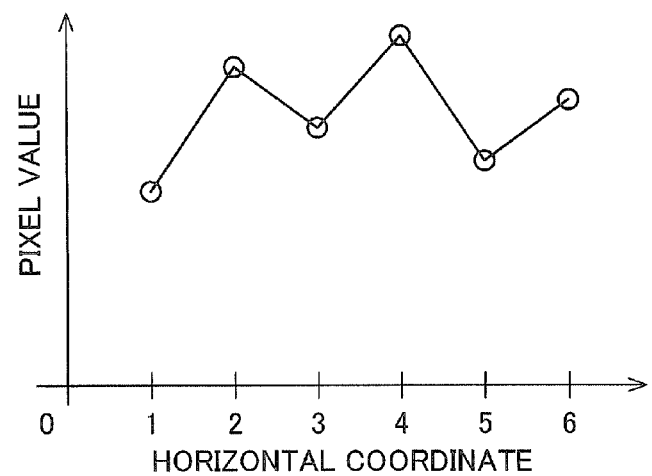
Figure 17C:
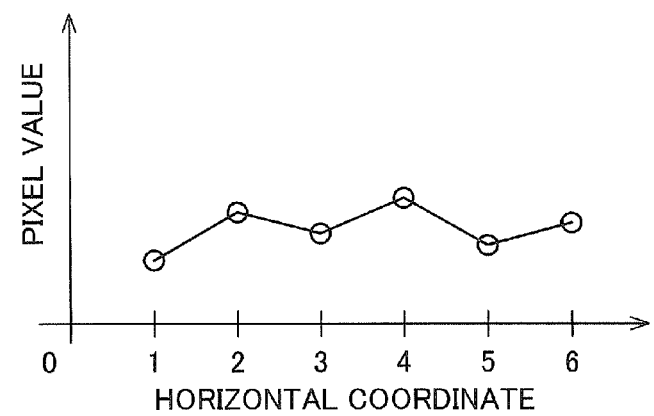

FIGS. 17B and 17C show the pixel values of the input image D0 obtained for part Q001. The brightness DU0 of the illumination light L000 is greater for the pixel values in FIG. 17B than in FIG. 17C.

Suppose now that for each pixel in the input image D0, the pixel selector 111 designates four successive pixels aligned in the horizontal direction, based at the pixel in the input image D0, as a pixel group of interest.

Consider the representative difference values D11 calculated for the designated pixel group of interest based at the pixel at horizontal coordinate 2 in the examples shown in FIGS. 17B and 17C. In this pixel group of interest, the absolute difference between the pixel values of the pixels at horizontal coordinate 2 and horizontal coordinate 3 is output as the representative difference value D11.

In this pixel group of interest, the representative difference value D11 is expressed by the following equation (8).

$$D11=DU0*(DU1(2)-DU1(3))*DU2 \quad (8)$$

DU1(2) is the reflection coefficient at horizontal coordinate 2 and DU1(3) is the reflection coefficient at horizontal coordinate 3 in FIG. 17A.

For the examples shown in FIGS. 17B and 17C, since the brightness DU0 of the illumination light L000 is greater in FIG. 17B, the representative difference value D11 in FIG. 17B is larger.

Generalizing from the examples above, even when input images of the same object are captured with the same camera, the representative difference values D11 increase with the brightness of the lighting when the images are captured.

Therefore, if the value of the combined feature data D12 is obtained by simply adding the representative difference values D11, even when input images of the same object are captured with the same camera, the value of the combined feature data D12 calculated for an input image obtained under brighter lighting conditions is larger than the value of the combined feature data D12 calculated for an input image obtained under dimmer lighting conditions.

Regardless of the brightness of the lighting, however, when input images of the same object are captured with the same camera, it is anticipated that the frequency spectra of the input images will spread to about the same extent. Therefore, in order to estimate how far the frequency spectrum of the input image spreads from the combined feature data D12, the value of the combined feature data D12 should be about the same whenever images of the same object are captured with the same camera, regardless of the brightness of the lighting.

In the image processing apparatus according to the second embodiment, since the combined feature data D12 are obtained by taking a sum of the representative difference values D11 multiplied by weighting coefficients determined from the representative luminance values DC, it is expected the value of the combined feature data D12 will be about the same regardless of the brightness of the lighting. The effect of weighting on the basis of representative luminance values DC will be described with reference to FIGS. 17B and 17C.

First the representative luminance values DC calculated for the designated pixel group of interest based at the pixel at horizontal coordinate 2 in the examples shown in FIGS. 17B and 17C will be described.

In both of the examples shown in FIGS. 17B and 17C, the representative luminance values DC are the pixel values of the pixel at horizontal coordinate 2. The representative luminance value DC is expressed by the following equation (9).

$$DC=DU0*DU1(2)*DU2 \quad (9)$$

For the examples shown in FIGS. 17B and 17C, since the brightness DU0 of the illumination light L000 is greater in FIG. 17B, the representative luminance value DC in FIG. 17B is larger.

Therefore, for the designated pixel group of interest based at the pixel at horizontal coordinate 2, the weighting coefficient KA determined from the representative luminance value DC in FIG. 17B has a smaller value.

The calculation of the value of the combined feature data D12 by the method described in the second embodiment will now be considered by generalization from the examples above.

Even when input images of the same object are captured with the same camera, the representative difference value D11 (u, v) increases with the brightness of the lighting when the images are captured. The weighting coefficient KA(u, v), however, decreases.

Accordingly, even though the representative difference value D11 (u, v) increases with the brightness of the lighting when the image is captured, since the weighting coefficient KA(u, v) decreases accordingly, the product of the representative difference value D11 (u, v) and the weighting coefficient KA(u, v) is less susceptible to the effect of the brightness of the lighting when the images are captured.

As a result, for images of the same object captured with the same camera, it can be expected that substantially the same value will be output as the combined feature data D12 calculated by the method described in the second embodiment, regardless of the brightness of the lighting when the images are captured. Accordingly, how far the frequency spectrum of the input image D0 spreads can be estimated from the combined feature data D12, regardless of the brightness of the lighting when the image is captured.

To put the above effect in different words, in the image processing apparatus according to the second embodiment, the representative luminance calculator 114 is added to the image processing apparatus in the first embodiment, a representative luminance value representing the pixel value data DA is output as the representative luminance value DC, and the value of the combined feature data D12 is calculated by taking a sum of the representative difference values D11 multiplied by weighting coefficients determined from the representative luminance values DC. The effect of the brightness of the lighting when the input image D0 is obtained is therefore reduced sufficiently to enable the spread of the frequency spectrum of the input image D0 to be estimated from the combined feature data D12.

The method of obtaining the representative luminance value DC is not restricted to the method described above; any value that increases with the pixel values constituting the pixel value data DA may be used as the representative luminance value DC, such as, for example, a mean value of the pixel values constituting the pixel value data DA.

Third Embodiment

Figure 18:
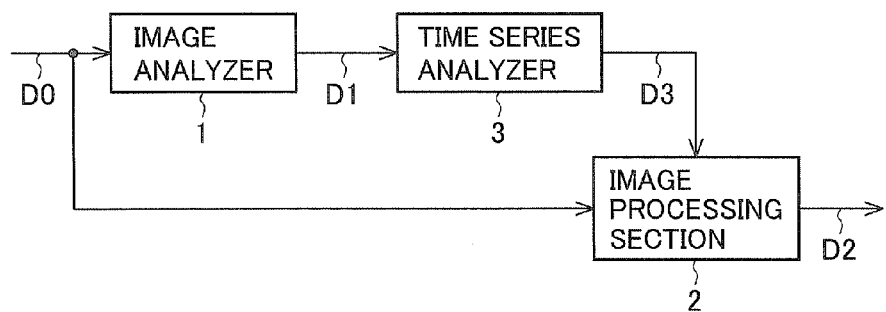
FIG. 18 is a block diagram of an image processing apparatus according to a third embodiment of the invention.

FIG. 18 shows the structure of an image processing apparatus according to a third embodiment. A moving picture can in general be divided into a plurality of images corresponding to frames; the image received by the image processing apparatus in the third embodiment corresponds to one of these frames. The input image D0 shown in FIG. 18 is accordingly equivalent to one frame of a moving picture, and changes over time.

Since the structure and the operation of the image analyzer 1 in the third embodiment are the same as in the first embodiment, descriptions will be omitted. Alternatively, the structure and the operation of the image analyzer 1 may be the same as in the second embodiment. Since the input image D0 changes over time, however, the resolution discrimination signal D1 output from the image analyzer 1 also changes over time.

A time series analyzer 3 outputs a cumulative resolution D3 generated by using the resolution discrimination signal D1 output from the image analyzer 1. The image processing section 2 processes the input image D0 in different ways depending on the value of the received cumulative resolution D3.

The cumulative resolution D3 output by the time series analyzer 3, which receives the resolution discrimination signal D1, is a resolution discrimination signal that has undergone time series processing. The value of the cumulative resolution D3 increases or decreases depending on the value of the resolution discrimination signal D1. More specifically, when the value of the resolution discrimination signal D1 is greater than a first threshold value th31A, the value of the cumulative resolution D3 increases; when the value of the resolution discrimination signal D1 is less than a second threshold value th31B, the value of the cumulative resolution D3 decreases; when the value of the resolution discrimination signal D1 is equal to or less than the first threshold value th31A and equal to or greater than the second threshold value th31B, the cumulative resolution D3 maintains the same value. The first threshold value th31A is greater than the second threshold value th31B.

An upper limit is set on the value of the cumulative resolution D3, however; when the value obtained by the above computation is greater than the upper limit, the upper limit value is output instead of the value obtained by the above computation. A lower limit is also set on the value of the cumulative resolution D3; when the value obtained by the above computation is less than the lower limit, the lower limit value is output instead of the value obtained by the above computation. The upper and lower limits of the cumulative resolution D3 are also referred to as the first upper limit value and the first lower limit value.

When the cumulative resolution D3 is increased or decreased, the amount by which it changes per frame is determined so that the time required for a transition between the upper and lower limit values seems natural to the viewer.

The effect caused by the presence of the time series analyzer 3 will be described with reference to FIGS. 19 and 20. The image processing apparatus according to the third embodiment is used in a moving picture display device U101. More specifically, the image constituting each frame of a moving picture D100 received by the moving picture display device U101 is processed in the image processing apparatus according to the third embodiment and output on the monitor screen of the moving picture display device U101. The moving picture D100 is output from a moving picture reproducing device U100.

The moving picture reproducing device U100 can reproduce moving pictures recorded in the DVD-Video format (referred to as DVD video below) and moving pictures recorded in the BDMV (blue ray disc movie) format (referred to as BD video below). The pixel counts of the moving picture D100 are fixed at 1920 pixels horizontally and 1080 pixels vertically.

A BD video image has pixel counts of 1920 pixels horizontally 1080 pixels vertically. Therefore, when BD video is reproduced, the image equivalent to each frame of the moving picture D100 is output without being enlarged. A DVD video image, however, has pixel-counts of 720 pixels horizontally and 480 pixels vertically. Accordingly, when DVD video is reproduced, the image equivalent to each frame of the moving picture D100 is enlarged before being output. The spread of the frequency spectrum of the image equivalent to each frame of the moving picture D100 is therefore narrower when DVD video is reproduced than when BD video is reproduced.

Figure 20A:
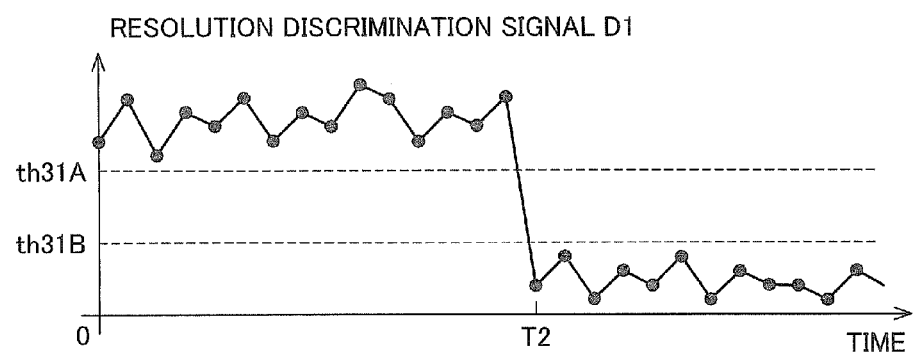
FIGS. 20A and 20B illustrate the operations of the time series analyzer in the image processing apparatus according to the third embodiment.
Figure 20B:
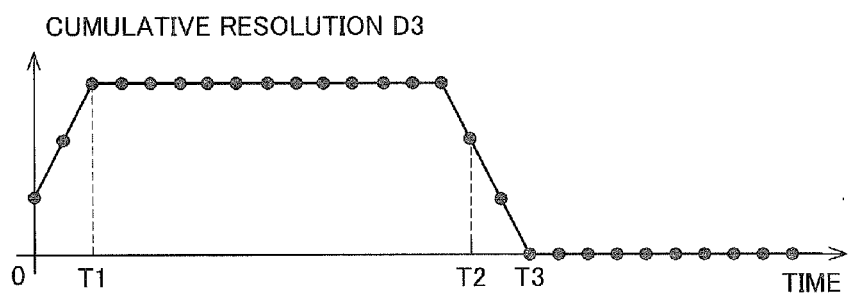

Assuming below that the image analyzer 1 is set so as to detect whether the frequency spectra of input images D0 equivalent to BD video frames spread to the expected extent, changes in the resolution discrimination signal D1 and the cumulative resolution D3 will be described with reference to FIGS. 20A and 20B. FIG. 20A shows changes in the resolution discrimination signal D1 over time; FIG. 20B shows changes in the cumulative resolution D3 over time. The lower limits of the resolution discrimination signal D1 and cumulative resolution D3 are zero.

BD video is output from the moving picture reproducing device U100 up to time T2 in FIG. 20A, and DVD video is output from time T2 onward. The value of the resolution discrimination signal D1 varies but remains at a comparatively high level before time T2, and then varies at a level approaching zero after time T2.

If the first threshold value th31A and the second threshold value th31B are set properly, the value of the resolution discrimination signal D1 is greater than the first threshold value th31A before time T2, and less than the second threshold value th31B from time T2 onward.

The cumulative resolution D3 then changes as shown in FIG. 20B.

First, since the value of the resolution discrimination signal D1 varies while staying above the first threshold value th31A before time T2, the value of the cumulative resolution D3 increases and reaches its upper limit at a time T1 prior to time T2.

Since the value of the resolution discrimination signal D1 varies while staying below the second threshold value th31B from time T2 onward, however, the value of the cumulative resolution D3 starts decreasing at time T2 and reaches its lower limit at a time T3.

Suppose now that the image processing section 2 processes the input image D0 in different ways on the basis of the resolution discrimination signal D1 or the cumulative resolution D3.

As shown in FIG. 20A, the value of the resolution discrimination signal D1 changes somewhat over time. The image processing carried out in the image processing section 2 accordingly changes over time.

An example in which the image processing section 2 in the third embodiment carries out enhancement processing, as in the first embodiment, will be described below.

Figure 21:
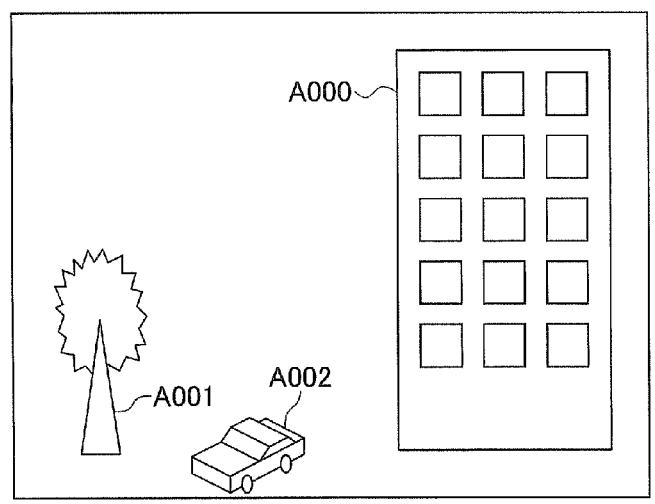
FIG. 21 shows an input image providing an example of the operation of the image processing apparatus according to the third embodiment.

FIG. 21 schematically shows an input image D0 in which the main objects are an object A000, an object A001, and an object A002, more specifically, a building, a tree, and a car. Object A002 is moving and appears at different positions from frame to frame; objects A000 and A001 remain stationary and appear in the same positions in every frame.

When enhancement processing is carried out for the input image D0 shown in FIG. 21, overshoot and undershoot may occur at the borders between objects A000, A001, and A002 and the background.

Figure 22A:
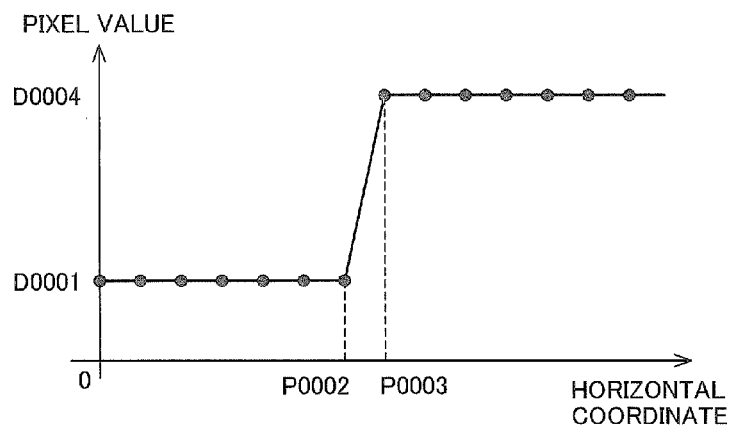
FIGS. 22A, 22B, and 22C illustrate the occurrence of overshoot and undershoot due to enhancement processing in the image processing apparatus.

In FIG. 22A, variations in pixel values of the input image D0 at positions near the border between object A000 and the background are plotted in the horizontal direction of the image. The border between object A000 and the background is represented by the pixel at horizontal coordinate P0002, which belongs to the background, and the pixel at horizontal coordinate P003, which belongs to object A000. The pixel values of the background are approximately D001 and the pixel values of object A000 are approximately D004.

Figure 22B:
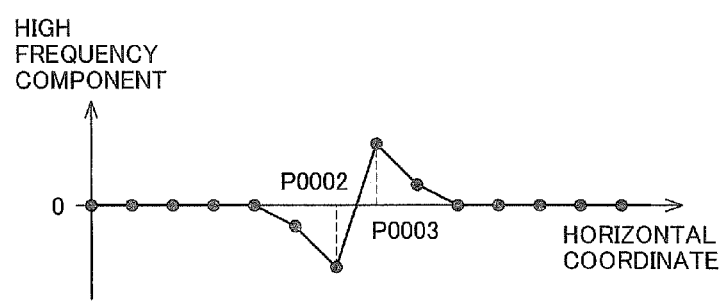
Figure 22C:
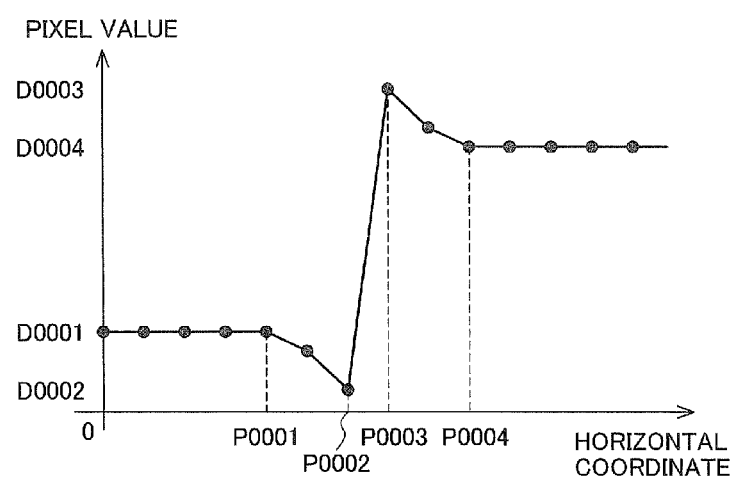

FIG. 22B shows the output supplied from the high-pass filter for the variations in the pixel values shown in FIG. 22A. FIG. 22C shows the result of adding the high-frequency component shown in FIG. 22B multiplied by a prescribed amplification factor to the variations in the pixel values shown in FIG. 22A; the result is equivalent to the variations in the pixel values of the output image D2 output from the image processing section 2.

As is apparent in the variations in the pixel values of the output image D2 shown in FIG. 22C, the pixel values of the pixels from the pixel at horizontal coordinate P0001 to the pixel at horizontal coordinate P0002 are generally less than the pixel values of the neighboring pixels, and the pixel value of the pixel at horizontal coordinate P002 is the local minimum value D0002.

The pixel values of the pixels from the pixel at horizontal coordinate P0003 to the pixel at horizontal coordinate P0004 are generally greater than the pixel values of the neighboring pixels, and the pixel value of the pixel at horizontal coordinate P003 is the local maximum value D0003.

As described above, enhancement processing produces undershoot, in which the enhanced pixel values are less than the neighboring pixel values, and overshoot, in which the enhanced pixel values are greater than the neighboring pixel values.

It is known that the intensity and width of overshoot and undershoot vary with the frequency response of the high-pass filter.

The overshoot intensity is the difference between the maximum pixel value in the region in which overshoot occurs and the neighboring pixel values, for example, the difference between D0003 and D0004 in FIG. 22C. The overshoot width is the number of pixels in the region in which overshoot occurs, for example, the difference between P0004 and P0003 in FIG. 22C.

The undershoot intensity is the difference between the minimum pixel value in the region in which undershoot occurs and the neighboring pixel values, for example, the difference between D0002 and D0001 in FIG. 22C. The undershoot width is the number of pixels in the region in which undershoot occurs, for example, the difference between P0002 and P0001 in FIG. 22C.

Suppose now that the enhancement processing carried out in the image processing section 2 is adjusted depending on the resolution discrimination signal D1, more specifically, that the frequency response of the high-pass filter used in the enhancement process is altered depending on the resolution discrimination signal D1.

As described above, since the value of the resolution discrimination signal D1 changes over time, the frequency response of the high-pass filter also changes over time. The output values of the high-pass filter accordingly change over time. The width and the intensity of the overshoot and undershoot that occur when the enhancement processing is carried out on the input image D0 also change.

Time-varying width and the intensity of overshoot and undershoot are known to be visually disturbing. Especially when overshoot and undershoot occur between background or foreground objects such as objects A000 and A001 that remain stationary over time, if the intensity and the width change over time, a visually annoying flicker occurs.

In the image processing apparatus according to the third embodiment, however, the cumulative resolution D3 is output from the time series analyzer 3, and the image processing section 2 processes the input image D0 in different ways on the basis of the cumulative resolution D3.

Because the value of the cumulative resolution D3 maintains constant levels in the time period starting at time T1 during which BD video is input and the time period starting at time T3 during which DVD video is input, even if overshoot and undershoot occur, their intensity and width are less likely to vary from frame to frame.

In short, visually annoying artifacts such as flicker are less likely to occur in the output images when the image processing section 2 processes the input images D0 according to the cumulative resolution D3 instead of the resolution discrimination signal D1 determined from each image.

Put differently, visually annoying artifacts are less likely to occur in the output images when the image processing section 2 changes the processing of the input images D0 by use of the cumulative resolution D3 calculated using the resolution discrimination signals D1 determined from a plurality of input images D0, instead of using the resolution discrimination signal D1 determined from just one input image D0.

The processing carried out by the image processing section 2 is not restricted to the enhancement processing described above, but may include other processing, such as noise reduction.

Fourth Embodiment

Figure 23:
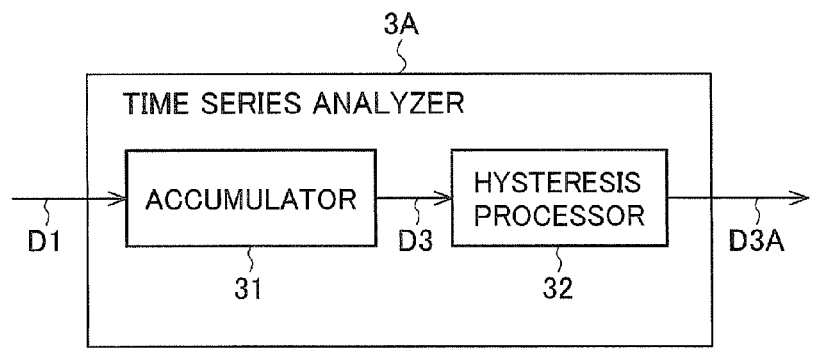
FIG. 23 is a block diagram of the time series analyzer in an image processing apparatus according to a fourth embodiment of the invention.

The image processing apparatus according to the fourth embodiment has the same structure as the image processing apparatus according to the third embodiment, but differs from the image processing apparatus according to the third embodiment in using a different time series analyzer 3A, which replaces the time series analyzer 3. FIG. 23 shows the structure of the time series analyzer 3A in the image processing apparatus according to the fourth embodiment.

The time series analyzer 3A includes an accumulator 31 that operates in the same way as the time series analyzer 3 in the third embodiment, and a hysteresis processor 32 that receives the cumulative resolution D3 output from the accumulator 31. The cumulative resolution D3 is a resolution discrimination signal that has undergone cumulative processing. The hysteresis processor 32 outputs a resolution-with-hysteresis D3A from the time series analyzer 3A. The resolution-with-hysteresis D3A is a resolution discrimination signal that has undergone time series processing.

The operation of the hysteresis processor 32 will now be described. The hysteresis processor 32 increases or decreases the resolution-with-hysteresis D3A according to the scheme illustrated in FIG. 24.

First, when the value of the cumulative resolution D3 becomes greater than a third threshold value th41A, the hysteresis processor 32 increases the value of the resolution-with-hysteresis D3A by prescribed amounts until the value of the cumulative resolution D3 becomes less than a fourth threshold value th41B.

When the value of the cumulative resolution D3 becomes less than the fourth threshold value th41B, the hysteresis processor 32 decreases the value of the resolution-with-hysteresis D3A by the prescribed amounts until the value of the cumulative resolution D3 becomes greater than the third threshold value th41A.

Figure 24:
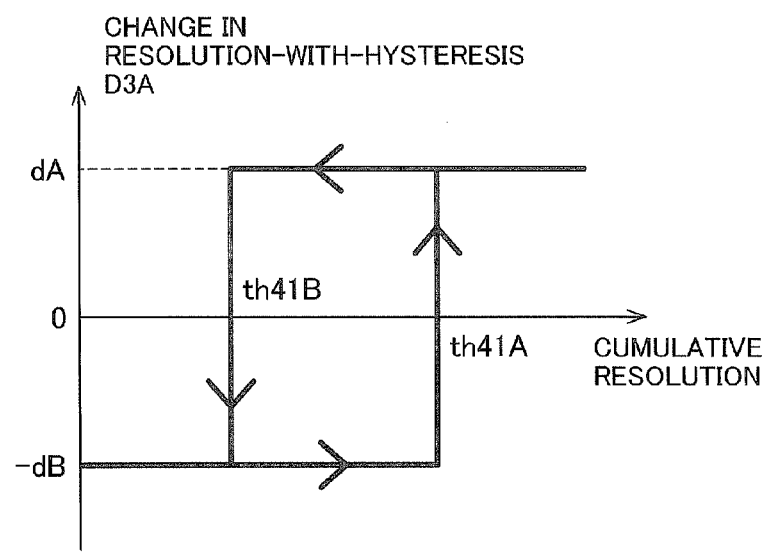
FIGS. 24, 25A, 25B, and 25C are graphs illustrating the operation of the hysteresis processor in the image processing apparatus according to the fourth embodiment.

Concerning the upper and lower limits and threshold values of the cumulative resolution D3, the upper limit is greater than the third threshold value th41A, which is greater than the fourth threshold value th41B, which is greater than the lower limit, as shown in FIG. 24.

An upper limit is set on the value of the resolution-with-hysteresis D3A, however; when the value obtained by the above computation is greater than the upper limit, the upper limit value is output instead of the value obtained by the above computation. A lower limit is also set on the value of the resolution-with-hysteresis D3A; when the value obtained by the above computation is less than the lower limit, the lower limit value is output instead of the value obtained by the above computation. The upper and lower limits of the resolution-with-hysteresis D3A are also referred to as the second upper limit value and the second lower limit value.

When the resolution-with-hysteresis D3A is increased or decreased, the amount by which it changes per frame is determined so that the time required for a transition between the upper and lower limit values seems natural to the viewer. The amount of change per frame has to be selected, however, to enable the resolution-with-hysteresis D3A to catch up with a transition in the value of the resolution discrimination signal D1 in a proper span of time. As shown in FIGS. 20A and 20B, the cumulative resolution D3 tracks the resolution discrimination signal D1 with a delay of a few frames. As shown in FIG. 25, the resolution-with-hysteresis D3A lags the cumulative resolution D3 by a few additional frames. Since the image processing section processes the input image D0 with inappropriate resolution until the resolution-with-hysteresis D3A catches up with the resolution discrimination signal D1, the viewability of the image may be degraded for the viewer.

Figure 19:
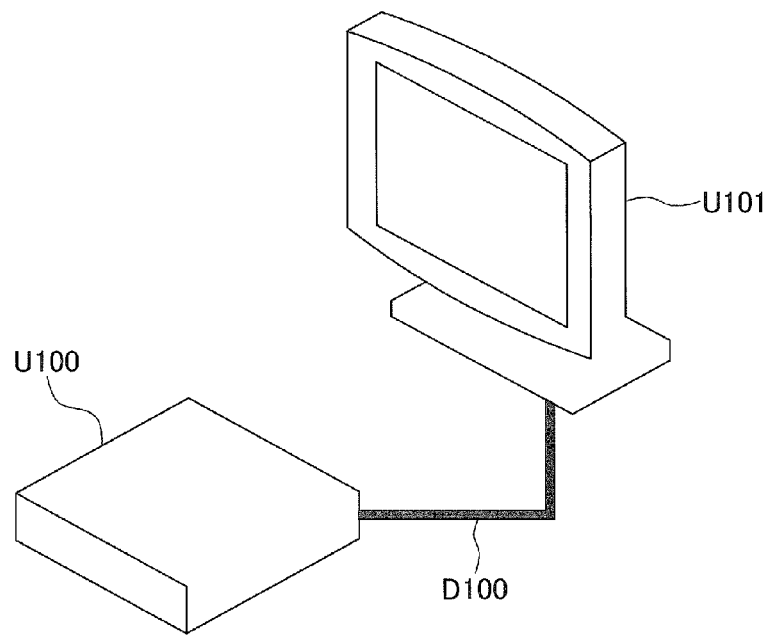
FIG. 19 illustrates an exemplary usage of the image processing apparatus according to the third embodiment.

The image processing apparatus according to the fourth embodiment can be used instead of the image processing apparatus according to the third embodiment in, for example, the environment illustrated in FIG. 19. The operations and effects when the image processing apparatus according to the fourth embodiment is used under the same conditions as the image processing apparatus according to the third embodiment will be described below with reference to FIGS. 25A to 25C.

Figure 25A:
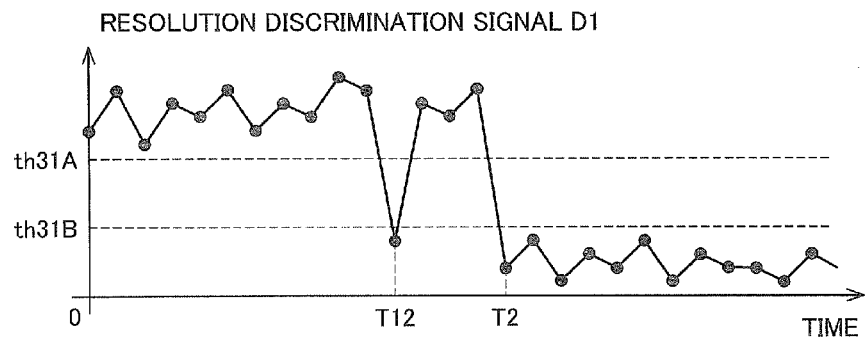
Figure 25B:
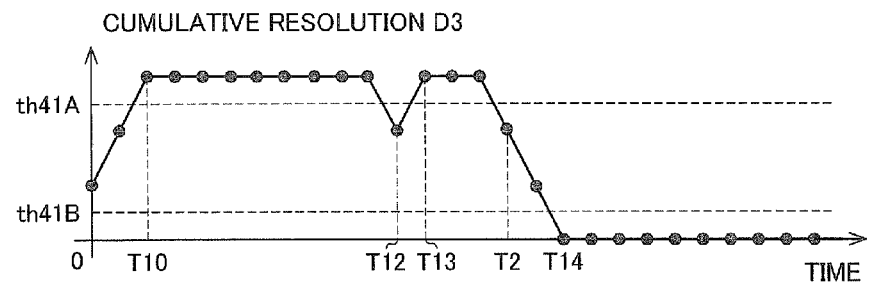
Figure 25C:
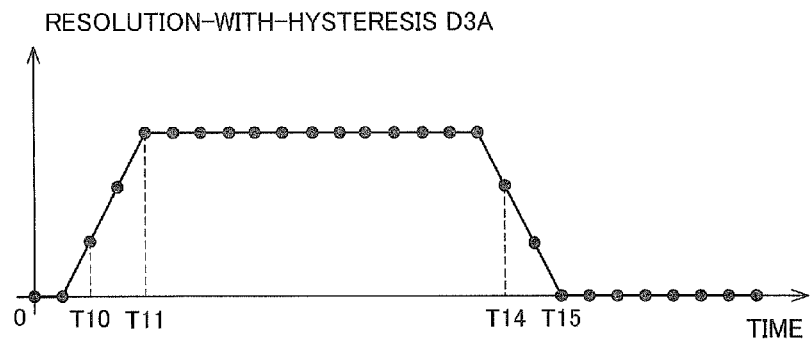

FIG. 25A shows changes in the resolution discrimination signal D1 over time; FIG. 25B shows changes in the cumulative resolution D3 over time; FIG. 25C shows changes in the resolution-with-hysteresis D3A over time.

In the example shown in FIG. 25A, as in the example shown in FIG. 20A, BD video is output from the moving picture reproducing device U100 up to time T2. During this period, the value of the resolution discrimination signal D1 varies at a generally high level. DVD video is output from the moving picture reproducing device U100 from time T2 onward. The value of the resolution discrimination signal D1 then varies at a generally low level, approaching zero.

In the example shown in FIG. 25A, however, while BD video is being output from the moving picture reproducing device U100 at time T12 (prior to time T2), the output value of the resolution discrimination signal D1 goes below the second threshold value the 31B. This might occur because of erroneous detection due to poor performance of the image analyzer, or because an image with few high-frequency components appears in the BD video (such as, for example, when an image fades out gradually and the whole screen becomes white).

The cumulative resolution D3 then changes as shown in FIG. 25B. More specifically, the value of the cumulative resolution D3 first increases gradually to reach its upper limit, and then, starting at time T2, decreases gradually to reach its lower limit, as it did in FIG. 20B. The third threshold value th41A and the fourth threshold value th41B are selected so that the value of the cumulative resolution D3 is greater than the third threshold value th41A before time T2 and less than the fourth threshold value th41B from time T14 onward.

Because of the effect of the drop in the output value of the resolution discrimination signal D1 at time T12, however, the value of the cumulative resolution D3 temporarily drops at time T12, becoming less than the third threshold value th41A although still greater than the fourth threshold value th41B. Because the value of the resolution discrimination signal D1 increases, starting at time T12, and goes above the third threshold value th41A again, the value of the cumulative resolution D3 also increases, reaching the upper limit again at time T13, thus becoming greater than the third threshold value th41A. If the image processing section 2 were to receive the cumulative resolution D3, it would detect a drop in resolution at time T12 and temporarily change the image processing, which might annoy the viewer.

The resolution-with-hysteresis D3A changes as shown in FIG. 25C. More specifically, because the value of the cumulative resolution D3 goes above the third threshold value th41A at time T10, the value of the resolution-with-hysteresis D3A starts increasing at time T10 and reaches its upper limit at time T11. Because the value of the cumulative resolution D3 goes below the fourth threshold value th41B at time T14, the value of the resolution-with-hysteresis D3A starts decreasing at time T14 and reaches its lower limit at time T15.

Although the value of the cumulative resolution D3 falls temporarily at time T12, the value of the resolution-with-hysteresis D3A does not fall because the value of the cumulative resolution D3 does not go below the fourth threshold value th41B.

Put differently, when the output value of the resolution discrimination signal D1 falls temporarily, it causes the value of the cumulative resolution D3 to decrease, but the value of the resolution-with-hysteresis D3A is less susceptible to such temporary variations in the output value of the resolution discrimination signal D1.

It will also be appreciated that when the output value of the resolution discrimination signal D1 rises temporarily, although the value of the cumulative resolution D3 is affected and increases temporarily, the value of the resolution-with-hysteresis D3A is less susceptible to such effects and its output value is less likely to vary.

In short, the output value of the resolution-with-hysteresis D3A tends to vary even less than the cumulative resolution D3. Visually annoying artifacts such as flicker are therefore less likely to occur in the output video picture when the image processing section 2 processes the input images D0 according to the resolution-with-hysteresis D3A instead of the cumulative resolution D3.

Arbitrary combinations of the first to fourth embodiments described above, or embodiments in which some of the constituent elements of the first to fourth embodiments are altered or omitted, are also contemplated, and those skilled in the art will recognize that still further variations are possible within the scope of the invention, which is defined in the appended claims.

What is claimed is:

1. An image processing apparatus comprising:
   an image analyzer that obtains a resolution discrimination signal by analyzing variations in values of pixels spaced at prescribed intervals in an input image to determine an extent to which the input image includes signal components with frequencies equal to or greater than a particular frequency determined by the prescribed intervals, wherein the input image is a moving picture; and
   a time series analyzer that receives the resolution discrimination signal obtained by the image analyzer for each image in the moving picture as a time series, and generates a time series processed resolution discrimination signal, the time series analyzer comprising:
   an accumulator for receiving the resolution discrimination signal and outputting a cumulative resolution discrimination signal; and
   a hysteresis processor for receiving the cumulative resolution discrimination signal and outputting the time series processed resolution discrimination signal,
   wherein:
   the accumulator outputs the cumulative resolution discrimination signal within a range having a first upper limit value and a first lower limit value;
   when the received resolution discrimination signal is greater than a first threshold value, if the cumulative resolution discrimination signal is less than the first upper limit value, the accumulator increases the cumulative resolution discrimination signal;
   when the received resolution discrimination signal is less than a second threshold value which is less than the first threshold value, if the cumulative resolution discrimination signal is greater than the first lower limit value, the accumulator decreases the cumulative resolution discrimination signal;
   the hysteresis processor outputs the time series processed resolution discrimination signal within a range having a second upper limit value and a second lower limit value;
   from a time when the received cumulative resolution discrimination signal is greater than a third threshold value which is less than the first upper limit value until a time when the received cumulative resolution discrimination signal is less than a fourth threshold value which is less than the third threshold value and is greater than the first lower limit value, if the time series processed resolution discrimination signal is less than the second upper limit value, the hysteresis processor increases the time series processed resolution discrimination signal; and
   from a time when the received cumulative resolution discrimination signal is less than the fourth threshold value until a time when the received cumulative resolution discrimination signal is greater than the third threshold value, if the time series processed resolution discrimination signal is greater than the second lower limit value, the hysteresis processor decreases the time series processed resolution discrimination signal.

2. An image processing method comprising the steps of:
   obtaining a resolution discrimination signal by analyzing variations in values of pixels spaced at prescribed intervals in an input image to determine an extent to which the input image includes signal components with frequencies equal to or greater than a particular frequency determined by the prescribed intervals, wherein the input image is a moving picture; and
   receiving the resolution discrimination signal obtained by the image analyzer for each image in the moving picture as a time series, and generating a time series processed resolution discrimination signal, by performing the following steps:
   receiving the resolution discrimination signal and outputting a cumulative resolution discrimination signal; and
   receiving the cumulative resolution discrimination signal and outputting the time series processed resolution discrimination signal,
   wherein:
   in the step of receiving the resolution discrimination signal and outputting the cumulative resolution discrimination signal, the cumulative resolution discrimination signal is outputted within a range having a first upper limit value and a first lower limit value;

when the received resolution discrimination signal is greater than a first threshold value, if the cumulative resolution discrimination signal is less than the first upper limit value, the cumulative resolution discrimination signal is increased;

when the received resolution discrimination signal is less than a second threshold value which is less than the first threshold value, if the cumulative resolution discrimination signal is greater than the first lower limit value, the cumulative resolution discrimination signal is decreased;

in the step of receiving the cumulative resolution discrimination signal and outputting the time series processed resolution discrimination signal, the time series processed resolution discrimination signal is outputted within a range having a second upper limit value and a second lower limit value;

from a time when the received cumulative resolution discrimination signal is greater than a third threshold value which is less than the first upper limit value until a time when the received cumulative resolution discrimination signal is less than a fourth threshold value which is less than the third threshold value and is greater than the first lower limit value, if the time series processed resolution discrimination signal is less than the second upper limit value, the time series processed resolution discrimination signal is increased; and from a time when the received cumulative resolution discrimination signal is less than the fourth threshold value until a time when the received cumulative resolution discrimination signal is greater than the third threshold value, if the time series processed resolution discrimination signal is greater than the second lower limit value, the time series processed resolution discrimination signal is decreased.

* * * * *